(12) United States Patent
Kulatunga

(10) Patent No.: US 8,567,547 B2
(45) Date of Patent: Oct. 29, 2013

(54) REGENERATIVE BRAKING METHOD

(75) Inventor: N. Athula Kulatunga, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 13/069,791

(22) Filed: Mar. 23, 2011

(65) Prior Publication Data

US 2012/0168242 A1 Jul. 5, 2012

Related U.S. Application Data

(60) Provisional application No. 61/316,680, filed on Mar. 23, 2010.

(51) Int. Cl.
*B62D 61/06* (2006.01)

(52) U.S. Cl.
USPC .......................................... 180/210; 180/212

(58) Field of Classification Search
USPC ............. 180/210, 213, 214, 216, 65.1, 65.21, 180/65.31, 65.6, 908, 212; 280/5.508, 280/5.509, 5.51, 124.103
See application file for complete search history.

(56) References Cited

U.S. PATENT DOCUMENTS

| | | | |
|---|---|---|---|
| 3,688,169 A | 8/1972 | Yamaya et al. | |
| 3,921,745 A | 11/1975 | McCulloch et al. | |
| 4,111,274 A | 9/1978 | King et al. | |
| 6,217,398 B1 | 4/2001 | Davis | |
| 7,108,097 B1 * | 9/2006 | Bolton et al. | 180/206.7 |
| 7,808,214 B2 | 10/2010 | Bartilson | |
| 7,984,776 B2 | 7/2011 | Sastry et al. | |
| 8,141,890 B2 * | 3/2012 | Hughes et al. | 280/124.103 |
| 2001/0000394 A1 | 4/2001 | Whittaker | |
| 2010/0194192 A1 | 8/2010 | O'Gorman et al. | |
| 2010/0270983 A1 | 10/2010 | Gong et al. | |
| 2011/0001442 A1 | 1/2011 | Lee et al. | |
| 2012/0202649 A1 * | 8/2012 | Huber | 482/2 |

* cited by examiner

*Primary Examiner* — Faye M. Fleming
(74) *Attorney, Agent, or Firm* — John V. Daniluck; Bingham Greenebaum Doll LLP

(57) ABSTRACT

A neighborhood electrical vehicle (NEV), including provisions for improved deceleration during regenerative braking, in which the vehicle momentum is converted to electrical energy stored in a capacitor bank. The capacitor bank includes alternate configurations for charging or discharging of the capacitors.

22 Claims, 22 Drawing Sheets

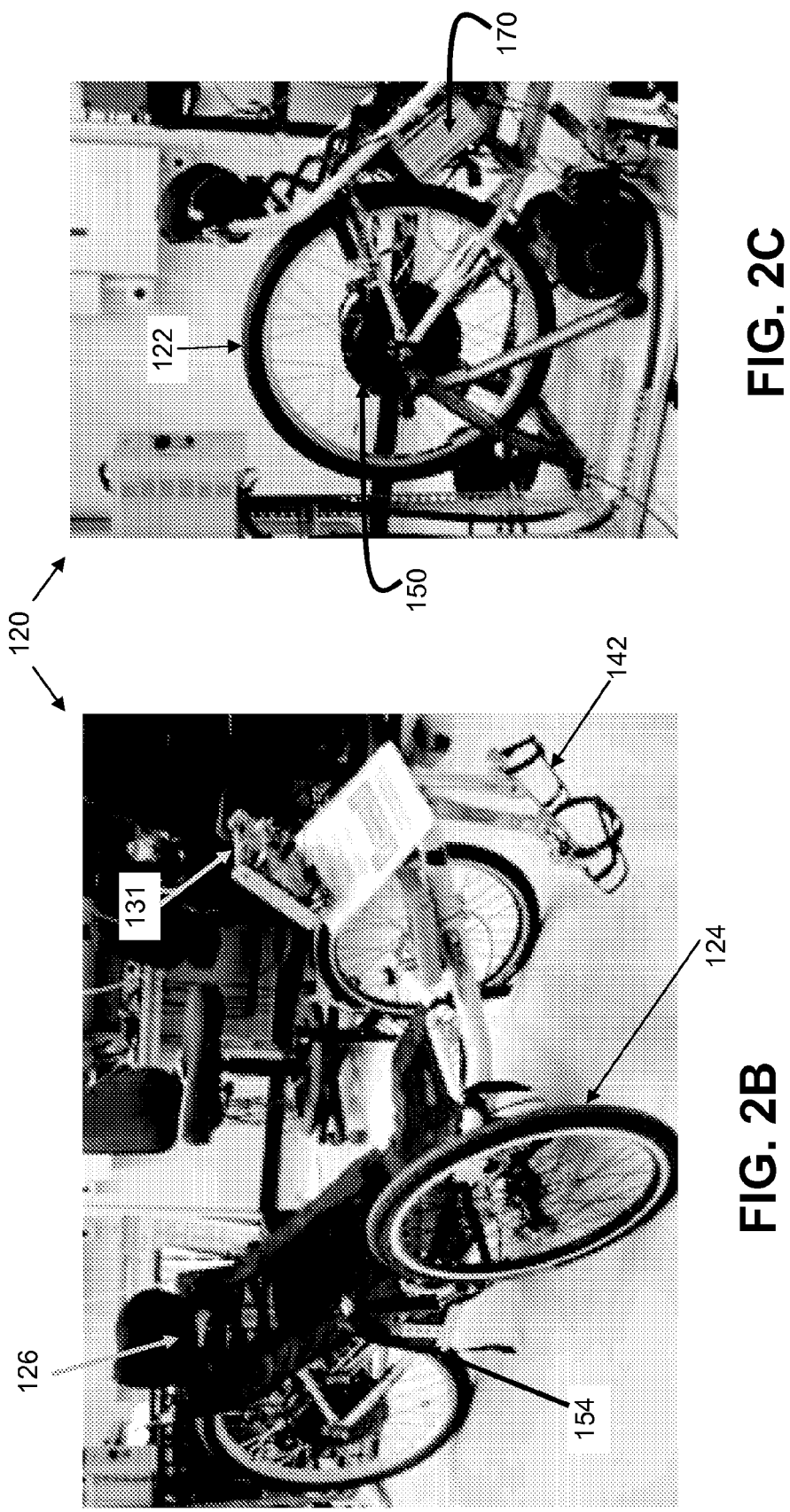

(1) $F_{rol} = -M g C_r = -(M_{cyclist} + M_{Bicycle}) g C_r$ (2) $F_{grav} = -M g = -(M_{cyclist} + M_{bicycle}) g \sin(\alpha)$ (3) $F_{air} = -\frac{1}{2} A C_w \rho \phi^2$ (4) $F_{air} = -\frac{1}{2} A C_w \rho (v - w_{\|v})^2$ (5) Total Energy $\Delta E = -(F_{rol} + F_{grav} + F_{air}) \Delta s$ (6) Power required $P = \frac{\Delta E}{\Delta t}$

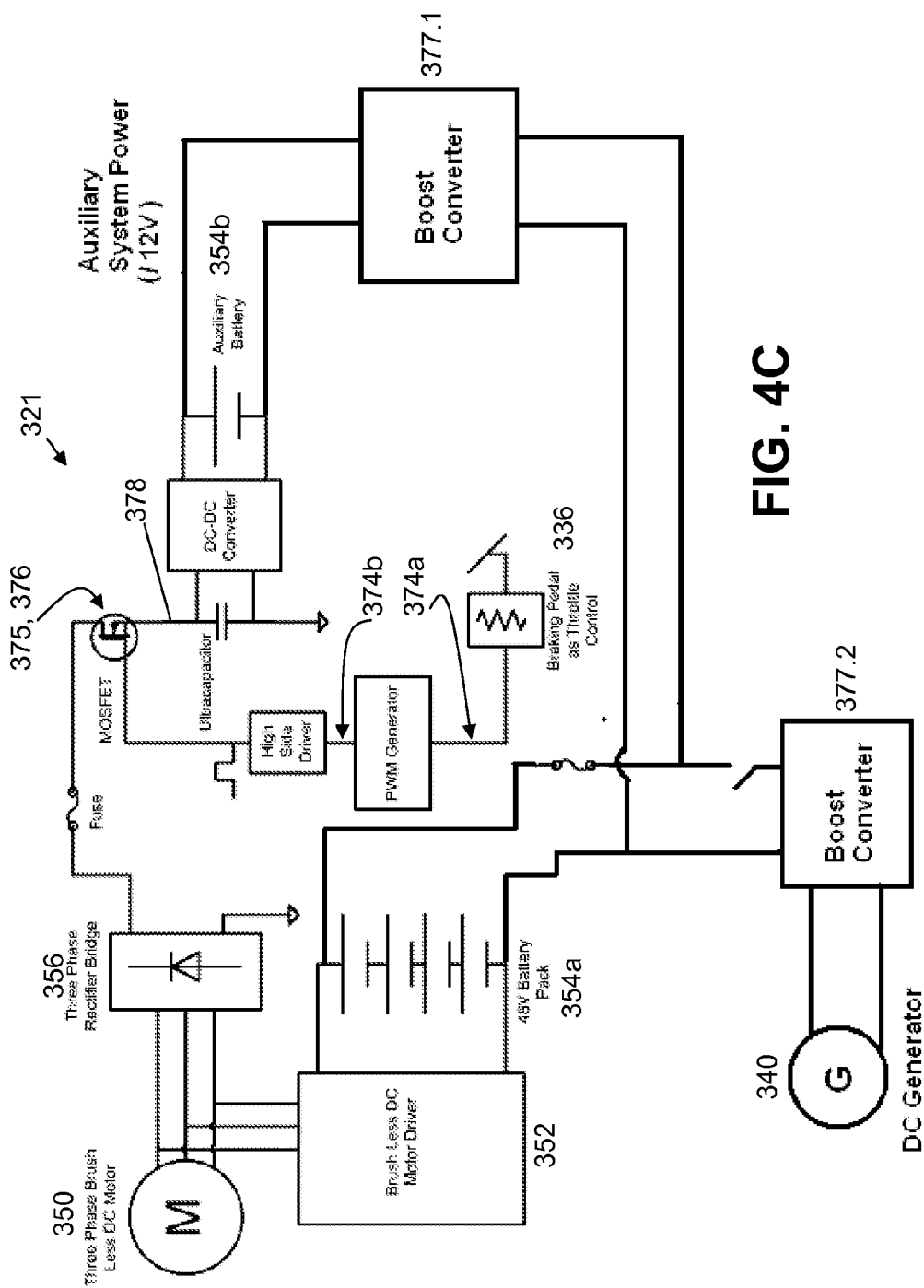

REGENERATIVE BRAKING METHOD

CROSS REFERENCE TO RELATED APPLICATION

This application claims the benefit of priority to U.S. Provisional Patent Application Ser. No. 61/316,680, filed Mar. 23, 2010, entitled REGENERATIVE BRAKING METHOD, incorporated herein by reference.

FIELD OF THE INVENTION

The present invention pertains to vehicles that are at least partly powered manually, including vehicles with electrically regenerating braking systems.

BACKGROUND OF THE INVENTION

A neighborhood electric vehicle (NEV) is a battery powered, speed limited, street legal vehicle that should not go above 25 miles per hour. One objective of the United States Department of Transportation (USDOT) is to allow the creation of local transportation within communities those are connected via inter-community high speed transit methods, such as railways, that can help minimize many transportation, emission and energy problems. Today, NEV models are commercially available, serving civilian to military needs.

Lessons learned in automobile industry for last one hundred years may be used to guide the development of NEV for today's needs. In order NEV to be popular and competitive in the long run, several criterions should be met. These include a) appeal to user, b) feel and comfort, c) energy efficiency, d) low cost, e) upgradeable, and f) easy to repair. A new NEV should appeal to users and make users feel like they are in a different time. Gasoline power scooters have been around for many decades but never became popular as a neighborhood vehicle. Feel and comfort can influence how often a NEV is used. Frequent use of NEV means less reliance of fossil fuels. Users tend to use device with quick response and some feedback. A quiet, fast responding electric motor based drive systems can make users feel differently compared to ICE based vehicles. However, to obtain a good response the placement of motor and motor type should be analyzed carefully. Energy Efficiency should be a design consideration of a NEV if the USDOT recommended 30 miles range per charge is to be achieved. Mechanical and electronic systems should be scrutinized to get rid of the waste. Range can be increased by increasing battery size, but the additional weight and cost can become a problem. One challenge is to use the stored energy in batteries efficiently. NEVs are for short distance commutes, and for long commutes another vehicle or use of mass transit may be preferable. Therefore, the cost of a NEV should be kept as cheap as possible. Finally repair and maintenance of NEV should be simple enough for it to be performed by users.

What is needed is a neighborhood electric vehicle that provides efficient conversion of electricity generated during braking to the charging of a capacitor, or to the driving of a motor. Various embodiments of the present invention described herein do this in novel and unobvious ways.

SUMMARY OF THE INVENTION

Various aspects of the embodiments shown herein pertain to methods for generating electricity during braking of a vehicle, and the storage of that electricity in a capacitor.

One aspect of the present invention pertains to a vehicle having wheels and supporting a seat by a frame. Other embodiments include a motor mechanically coupled to at least one of the wheels, a rechargeable battery, and a capacitor. Still further embodiments include an electronic controller operable in at least two modes, wherein in a first mode of operation a controller receives alternating electrical power generated by a motor, and provides the power to a capacitor, and in a second mode of operation a controller provides power from a capacitor to a battery.

Another aspect of the present invention pertains to a method for operating an electric vehicle. Some embodiments include providing a tricycle, a braking lever movable over a range of positions, a plurality of ultracapacitors, and a seat, at least one of the wheels being coupled to an electric motor capable driving the wheel and capable of generating electricity. Other embodiments include generating electricity by the motor in response to placement of the lever within the range. Still other embodiments include slowing the vehicle by generating, and charging the ultracapacitors with the chopped voltage.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

FIG. 2B shows a hub-wheel driven tricycle according to one embodiment of the present invention.

FIG. 2C shows a test rig of the hub-wheel of FIG. 2B.

FIG. 4C shows a regenerative braking system according to yet another embodiment of the present invention.

DESCRIPTION OF THE PREFERRED EMBODIMENT

Figure 1:
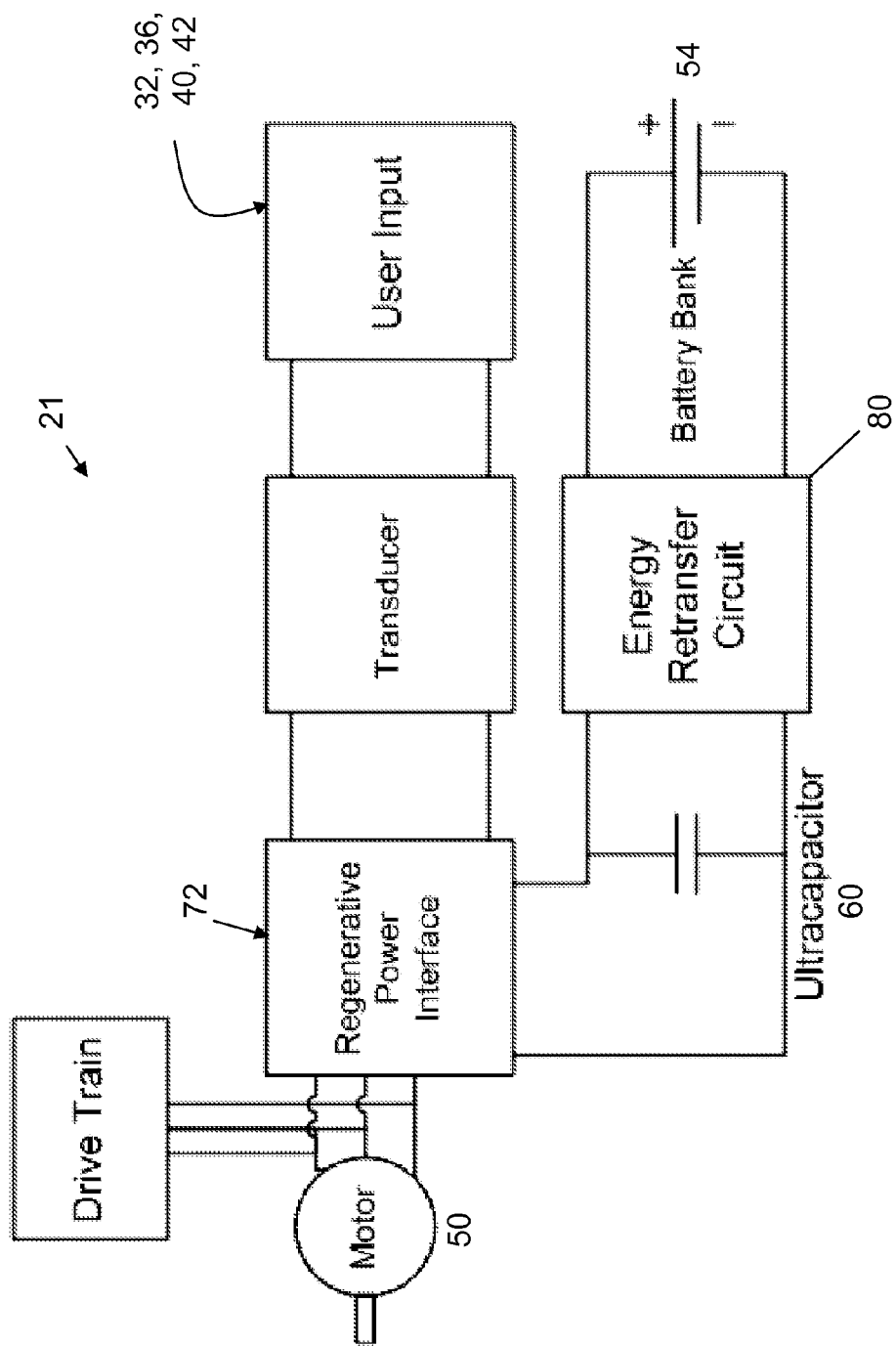
FIG. 1 is a schematic representation of an electromechanical topology for an electric vehicle according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Research related to electrical vehicles is gaining importance. Using regenerative braking when braking improves the efficiency of an electric vehicle as it recovers energy that could go to waste if mechanical brakes were used. Apparatus and methods for several novel regenerative braking systems for neighborhood electric vehicles are disclosed. One embodiment utilizes an ultracapacitor bank to capture energy. Various embodiments change the switching frequency of the current in controlling the negative torque applied by the motor while capturing energy. The user has direct control over the amount of current regenerated and hence the amount of negative torque applied for braking. The proposed regenerative braking system is better in recovering energy and slowing the vehicle compared to a commercially available regenerative braking system.

A regenerative braking system according to one embodiment of the present invention includes a brushless DC hub motor (Trapezoidal Permanent Magnet AC machine) based recumbent tricycle. In one embodiment the vehicle has two lead acid battery banks of different capacity acting as the main and auxiliary power sources. Main battery bank provides power only to the motor and the auxiliary power system powers the sensors, electronics, touch screen display and the regenerative braking system. In yet other embodiments, there is a single battery bank that provides power to all systems, and further which is recharged by the regenerative braking system. In yet a third embodiment, the vehicle includes no batteries, and instead all vehicle electrical power is generated during braking, and saved in an ultracapacitor. In some embodiments, ultracapacitors are used to recover the regenerative energy as they are capable of absorbing large currents compared to a battery.

FIG. 1 schematically shows an electromechanical topology 21 according to one embodiment of the present invention. A vehicle operator provides inputs such as a drive throttle 32, regeneration throttle 36, and in some embodiments a pair of foot pedals 42 attached to an electric generator 40. Various transducers provide those inputs to a regenerative power interface 72. Interface 72 is further in communication with the electrical output from a motor 50, and further in electrical communication with a capacitor 60. Interface 72 provides for the transfer of power from motor 50 to capacitor 60 and vice versa and also can provide power from generator 40 to capacitor 60. Capacitor 60 is in electrical communication with an energy retransfer circuit 80 that is further in electrical communication with a battery bank 54, such as a bank including a motive battery 54a (for providing power to motor 50), and/or an auxiliary battery 54b for providing power to other devices of vehicle 20.

Various embodiments of present invention contemplate the use of different battery technologies for energy storage, including as examples lead acid, Nickel Metal Hydride, Li-ion, Li polymer and Nickel Cadmium. Each battery type has its own advantages and disadvantages. But Nickel Metal Hydride (NiMh) is known for its robustness, energy density, power density and cycle life. One aspect of using batteries as regenerative braking charge absorbers is that the amount of current a battery can handle without damaging itself can be small compared to the current required to be drawn for a fast stop.

Ultracapacitor technology is a technology that can bridge gaps in technology. In some embodiments ultracapacitors have the capability to handle high currents during regenerative braking. Some ultracapacitors are known as an electric double layer capacitors, including two electrodes with micro pores and an electrolyte. Energy is stored in the double-layer capacitor as charge separation in the double-layer formed at the interface between the solid electrode material surface and the liquid electrolyte in the micro pores of the electrodes. They are an alternative to pulse batteries and can draw high currents without damage. In addition, ultracapacitors have longer shelf life and cycle life (typical cycle life—500,00 to 1000,000 cycles) when compared to batteries. However, the energy density is relatively low in comparison to batteries. Table 2.1 provides some specifications of Maxwell's BMOD0058-E015-B01 ultracapacitor compared to a 12V 10 Ah lead acid battery.

TABLE 2.1

Ultracapacitor, Battery Comparison

| Characteristic | Lead Acid Battery* Specifications | Ultracapacitor Specifications |
|---|---|---|
| Capacitance | 36,000 F (10 Ah) | 58 F |
| Maximum Terminal Voltage | 12 V | 15 V |
| Maximum Charging Current | 3 A* | 1500 A |
| Internal Resistance | — | 19 mf2 |
| Power Density | — | 2100 (W/kg) |
| Energy Density | 21.14 (Wh/kg) | 2.67 (Wh/kg) |

Ultracapacitor internal resistance is low compared to a battery. Some embodiments of the present invention include a DC/DC converter to interconnect one or more ultracapacitors with one or more batteries. Some aspects of having a DC/DC converter between the battery and the ultracapacitor include: Ultracapacitor voltage can be different from the battery voltage; Power capacity of the ultracapacitor can be higher than the battery; Power source terminal voltage can be kept relatively constant; Weight of the power source for a given peak power is smaller than the passive power source (battery); and DC/DC converter can be used as the battery charge regulator.

In one embodiment of the present invention, energy generated in a brushless DC hub motor (50, 150, 250, 350) of an electric tricycle (20, 120, 220, 320) is absorbed, electronically, into ultracapacitors (60, 160, 260, 360) at a rate determined by the position of a throttle (36, 136, 236, 336). This method allows gradual or instantaneous braking of the vehicle. The stored energy is continuously transferred to a battery (54, 154, 254, 354). The auxiliary battery powers a touch screen display, lights, and other auxiliary devices. The energy transfer occurs at a certain controlled frequency for proper throttle control. Another aspect of this invention is that the ultracapacitors are charged in parallel for energy absorption, and discharged in a series manner when the wheel demands quick release of energy. Further, the entire control system is preferably laid out on a single printed circuit board format, similar to the mother board of a personal computer.

In this embodiment, the system can be used to absorb regenerative energy from the hub or electric motor, including a quick transfer of energy from a burst source such as a gust of wind, pressure pads, shoes, etc. to the auxiliary battery pack and then used for productive uses. The available energy is absorbed at a faster rate in a controlled fashion. Some regenerative braking systems burn the captured energy through resistors before the next regeneration. A system according to one of the embodiments of the invention instead converts fast occurring energy into a usable form of energy by storing it in an auxiliary battery. When sudden acceleration is needed, the charged capacitors are reversed and applied by to the motor controller (52, 152, 252, 352). Energy transfer from the capacitors to the wheel is faster than energy transfer from the main battery. A printed circuit board, similar to a mother board of a personal computer, allows users to add different function by connecting auxiliary devices as needed.

Figure 2A:
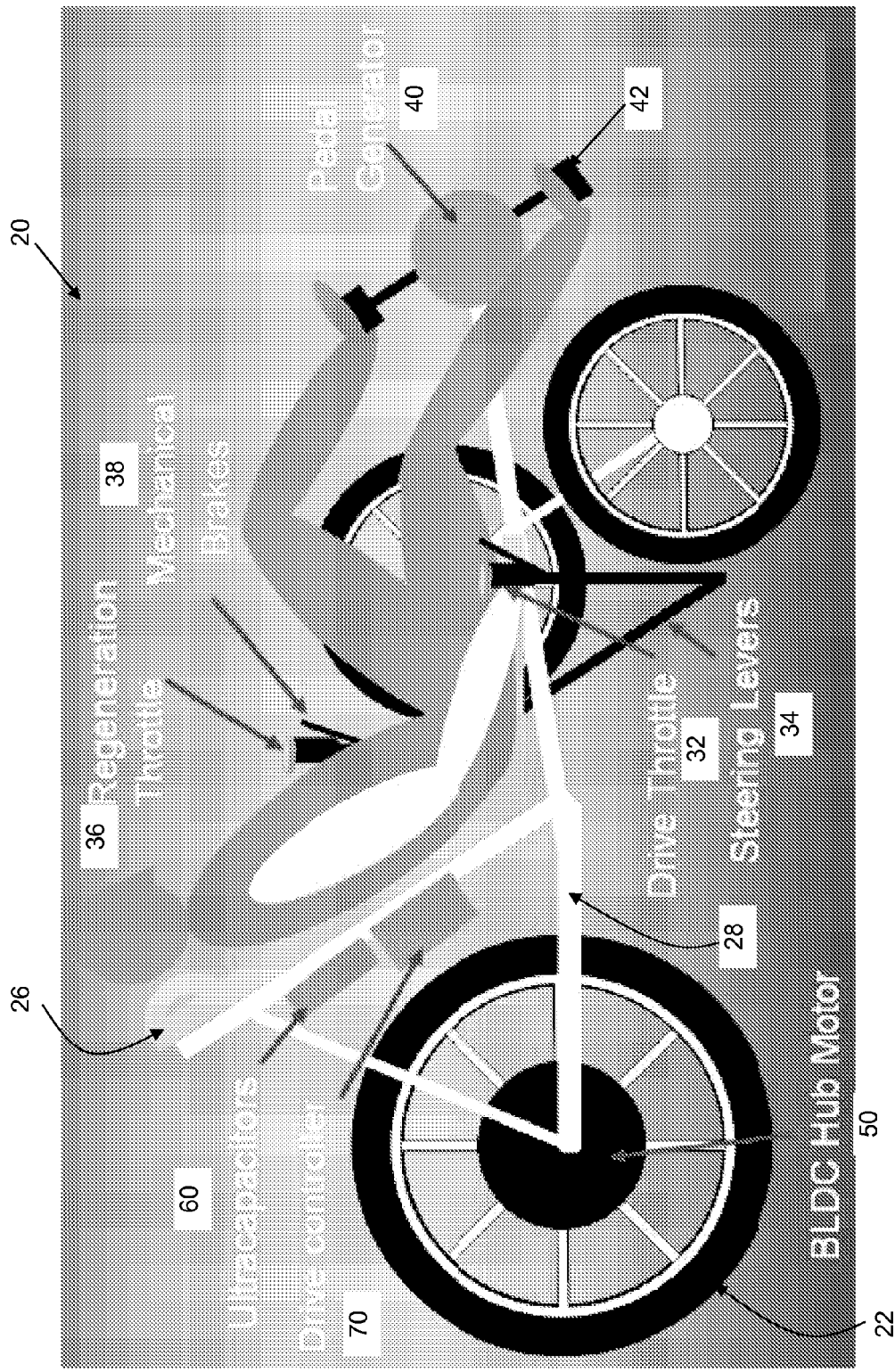
FIG. 2A shows a diagrammatic representation of an operator on a tricycle according to one embodiment of the present invention.

In yet another embodiment, the pedals (42, 142, 242, 342) of an electric recumbent tricycle are mounted on a permanent magnet alternator/generator (40, 140, 240, 340) which generates a varying DC voltage proportional to the pedaling speed (as referenced in FIGS. 2A and 4C). The generated energy is electronically controlled and absorbed in to a set of ultracapacitors. The stored energy in the capacitors is then supplied to a brushless dc motor through a controller according to the position of a throttle switch mounted on the steering column. The entire system is similar to an electronic chain that drives the wheel, without any mechanical parts, and independently from the pedaling rate. The system can be used to deliver energy from any pedaled generator to a motor driven wheel without using any batteries.

The available energy is absorbed at a faster rate in a controlled fashion to the ultracapacitors. The capacitors act as a energy reservoir. Some regenerative braking systems burn the captured energy through resistors before the next regeneration. In those embodiments having no battery, the vehicle is lighter. The rider can pedal leisurely, even when the tricycle is not moving. When sudden acceleration is needed, the charged capacitors are reversed and stored energy is applied to the motor controller. Regenerative energy during deceleration is captured to ultracapacitors. The rider may chose to power the wheel from the generator by bypassing the capacitor assistance and return home safely if the capacitor fails or more physical exercise is desired.

As shown in FIG. 2A, the NEV 20 includes a modified reclined tricycle frame and additional components such as a 3-phase, a BLDC motor 50 on the rear wheel 22, a 48V-40 A motor controller 70, an accelerator lever 32, a regeneration lever 36, an ultracapacitor 60, and a touch screen based display 31 with data logging capabilities.

Vehicle 20 includes an electronic controller 70 that provides power from ultracapacitor 60 to motor 50. In one embodiment, electrical power is provided from generator 40 as a result of the operator pedaling. Power generated by the operator can be applied directly by controller 70 to motor 50, where it is transformed into motive power to move vehicle 20. However, controller 70 includes an alternate mode of operation in which power from generator 40 is directed to the charging of capacitors 60.

Vehicle 20 includes a braking lever (or regeneration throttle) 36 that can be used by the operator to transform the kinetic energy of the vehicle to electrical power to be stored in capacitors 60. Further, if the deceleration of the vehicle is insufficient, vehicle 20 further includes a mechanical braking assembly 38 that includes conventional friction-producing apparatus at one or more wheels. In some embodiments, braking system 38 includes a separate hand lever, whereas in other systems there is a single braking lever 36. In those embodiments, movements of the lever over a first range provide a signal to controller 70 to perform regenerative braking. Further movement of the lever (past a deadband) will also actuate the mechanical braking system. In vehicle 20, electrical power is created either by pedaled generator 40, or by regeneration.

Figure 2D:
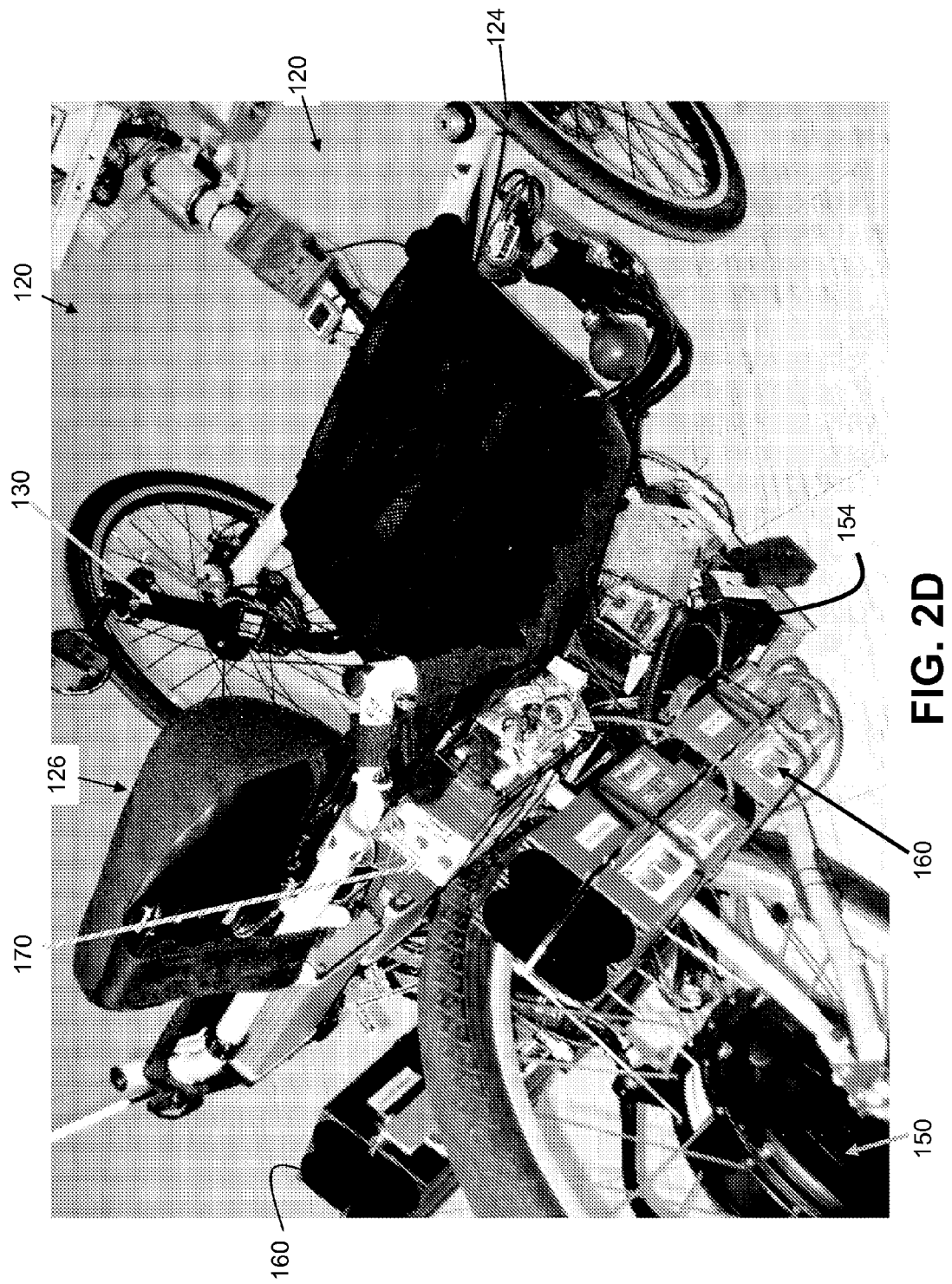
FIG. 2D is a photographic representation from the right and above the tricycle of FIG. 2B.

FIGS. 2B, 2C, and 2D are photographic representations of a vehicle 120 according to another embodiment of the present invention. Vehicle 120 is similar to vehicle 20; however vehicle 120 includes one or more batteries 154. In some embodiments, there is a first, motive power battery 154a that can be used to provide power to motor 150. Yet other embodiments include a second, auxiliary battery 154b that provides power to drive the instrumentation and display. In vehicle 120, ultracapacitors 160 provide storage for electrical power generated during regenerative braking. The power stored in capacitors 160 can be provided to either the auxiliary battery 154b, the motive battery 154a, or both.

FIG. 2C depicts the test rig, on which the rear wheel can be mounted for in-house testing. An external torque can be applied via commercially available, Minoura™ torque generator and an induction motor powered by a variable speed drive. Controller outputs, hall sensor signals, battery voltage, ultracapacitor charging current, and ultra capacitor voltage can be measured easily. A LeeCroy™ Waverunner scope is used for most of the data collection and analysis.

Figure 2E:
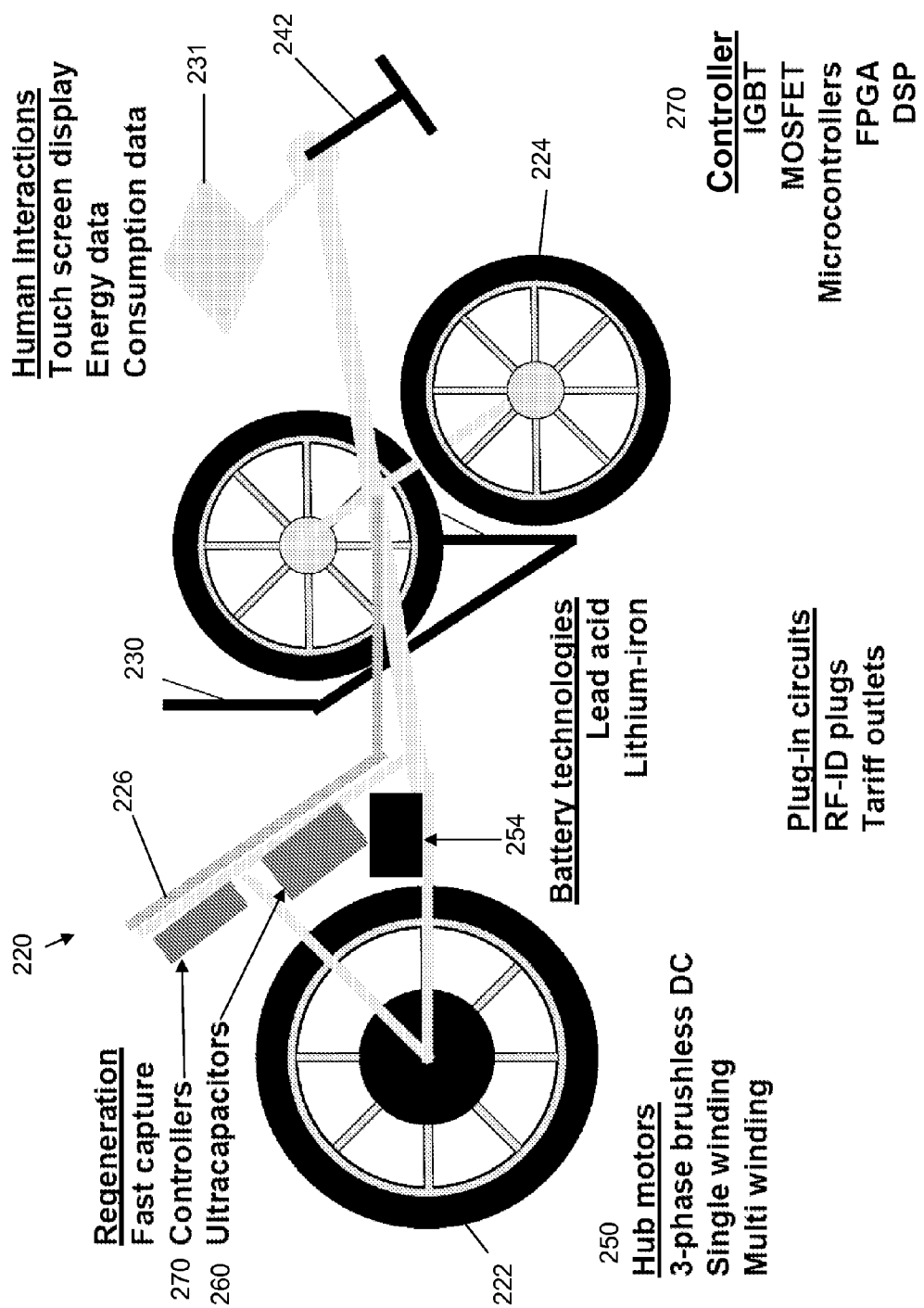
FIG. 2E shows technologies incorporated in various embodiments of the present invention.
Figures 3A, 3B:
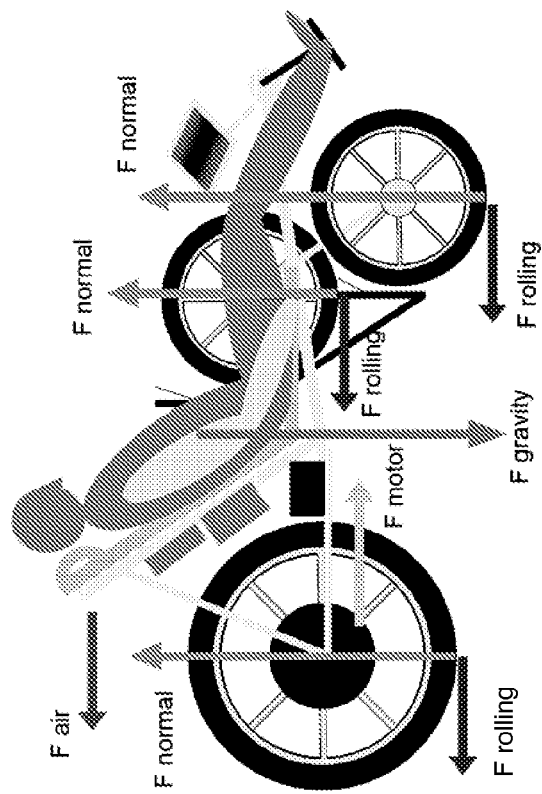
FIG. 3A shows general force, power, and energy equations.
FIG. 3B shows a free body diagram according to one embodiment of the present invention.

FIG. 2E shows major areas of technology according to various embodiments of the present invention with some description of the technology types. Brushed DC motor and BLDC were examined on the prototype. In some embodiments a BLDC is used on Vehicle 20. By using physics in motion applications, one can determine a good size of the motor. Then the operating voltage can be selected. FIG. 3A depicts some standard physics equations for motor sizing and FIG. 3B shows a free body diagram according to one embodiment of the present invention.

The touch screen display allows user to monitor various aspects of the NEV, including battery voltage, remaining expected distance, remaining battery charging cycles, DC bus/battery current, speed, etc. The user can retrieve some historical data for the past 30 minutes of the ride by touching "History" button on the display (as seen in FIG. 2E).

Figure 4A:
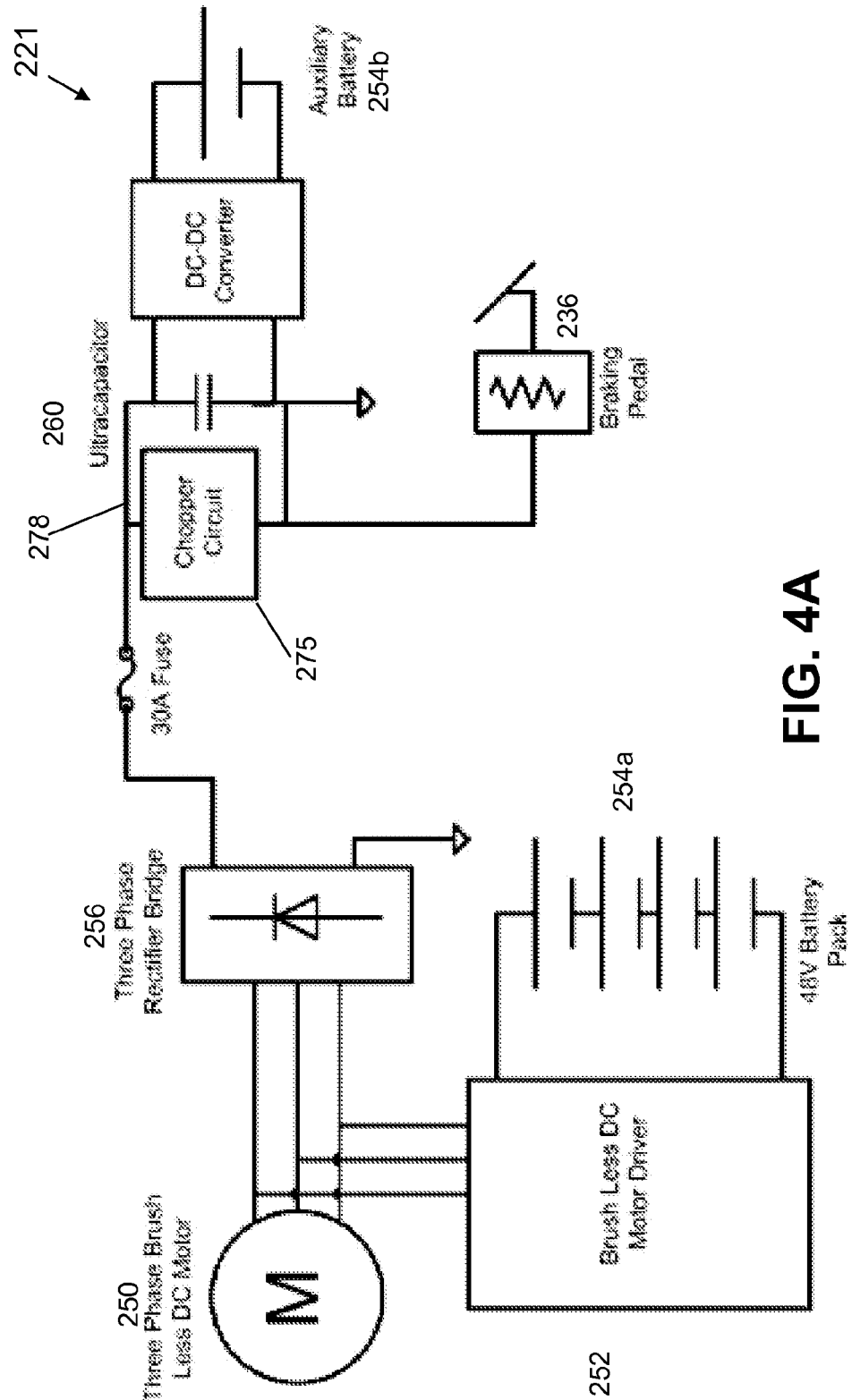
FIG. 4A shows a regenerative braking system block diagram according to one embodiment of the present invention.
Figure 4B:
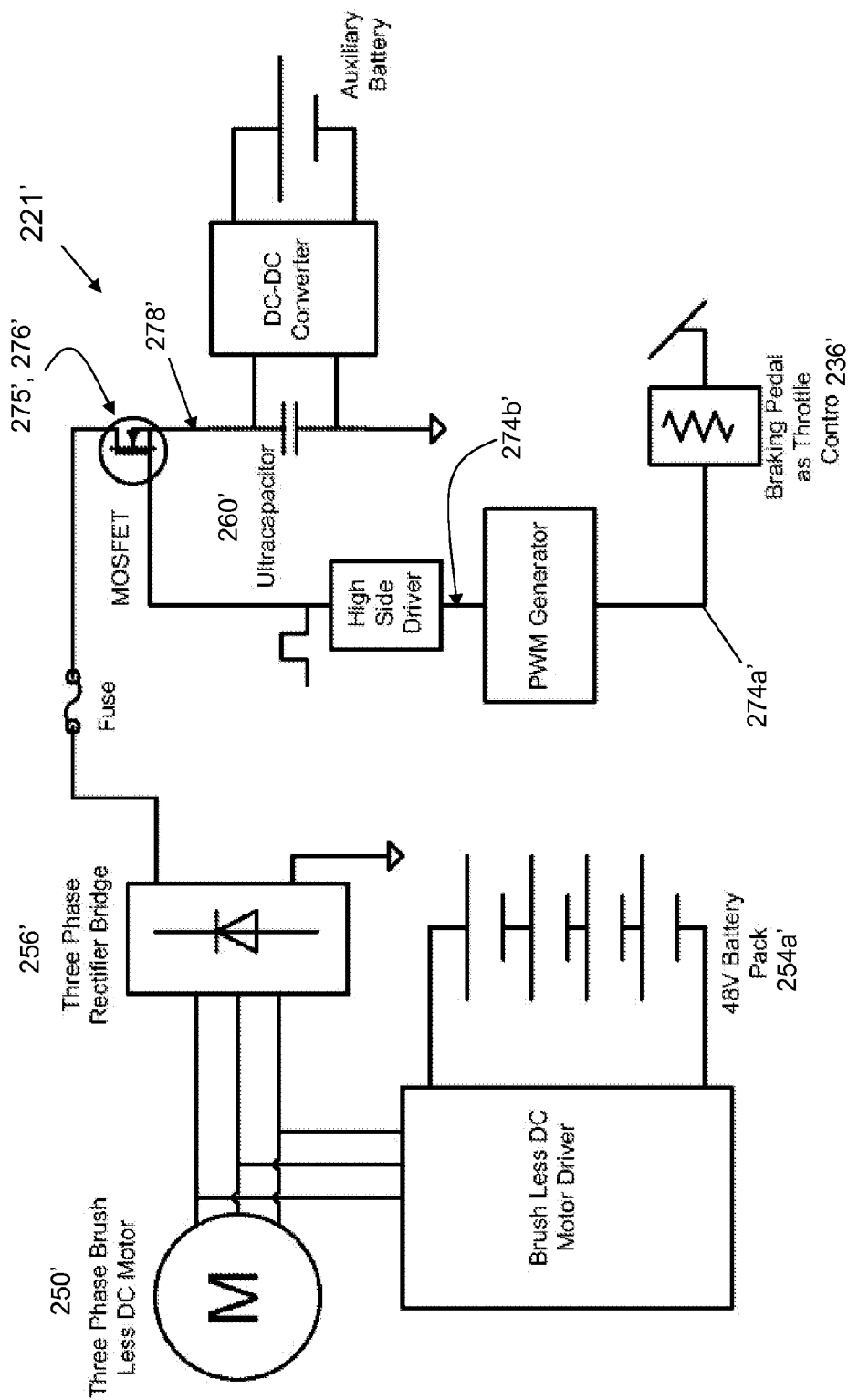
FIG. 4B shows a regenerative braking system block diagram according to another embodiment of the present invention.

FIGS. 4A and 4B are schematic representations of the electromechanical topologies 221 and 221' for a vehicle 220. When motor 250 is driven by the momentum of vehicle 220, electrical power from the three motor phases are provided to a rectifier bridge 256. The output of bridge 256 is substantially rectified to voltages greater than about 0, and in some embodiments can be further smoothed-out by a low pass filter (not shown). The rectified power is applied across a chopper circuit 275 (which in FIG. 4B is shown as a MOSFET 276'). This power is then chopped in relation to a pulse width modulated signal 274b. The duty cycle of PWM signal 274b is proportional to the regeneration control signal 274a that is provided by regeneration throttle 236. The signal 274a is proportional to the amount of braking that the operator wants to impose on vehicle 220.

Figure 5:
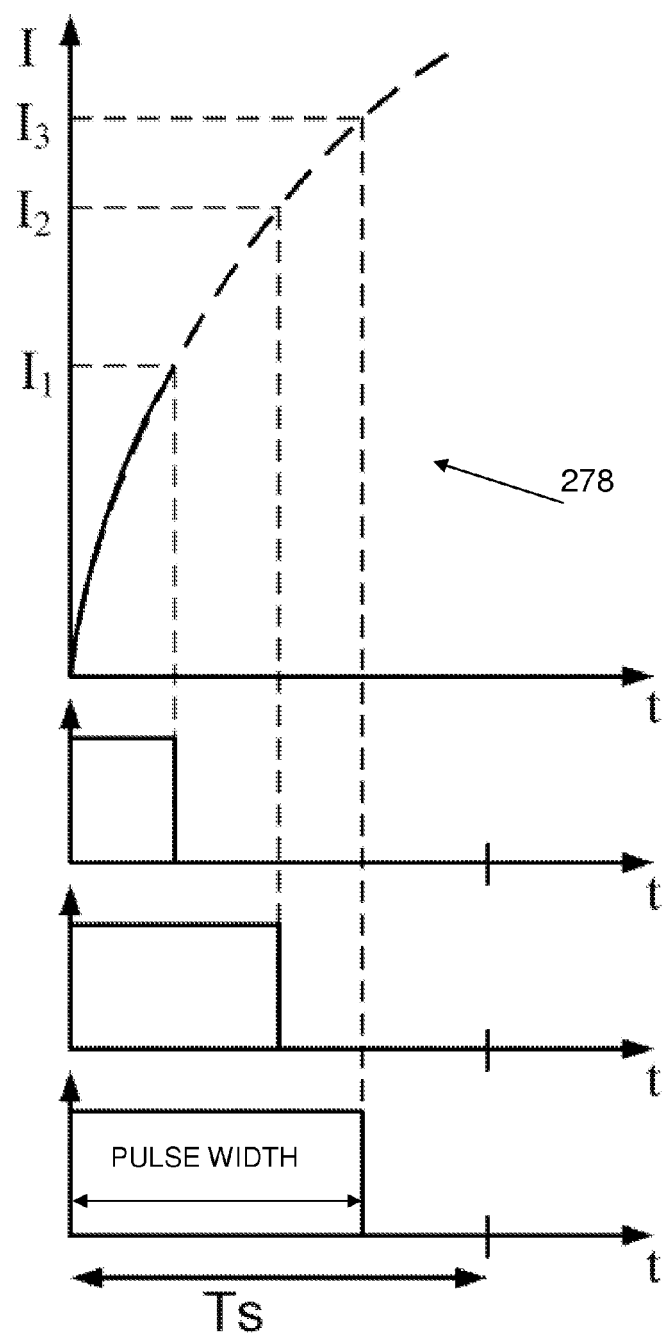
FIG. 5 shows current chopping according to one embodiment of the present invention.

The chopped electrical power 378 is applied to one or more capacitors 360 such as ultracapacitors. The waveform of the chopped current is best seen on FIG. 5. The frequency of the PWM signal is established by the size of the capacitor bank, and the resistance and inductance in the lines feeding the capacitor bank. As one example, the resistance and capacitance of the capacitor bank system establishes an RC time constant for the bank 260. Referring to FIG. 5, the modulation frequency is preferably less than about four RC time constants. The dwell of signal 274b preferably ranges from about 0.1 RC time constants to about two RC time constants.

FIG. 4C shows a topology 321 for a vehicle 320 according to another embodiment of the present invention. Topology 321 is similar to that shown in FIG. 4B, except that the main battery pack 354a can be recharged from either auxiliary battery 354b or by electrical power generated by the user via generator 340. In those embodiments in which auxiliary battery 354b is stored at a voltage lower than that of battery 354a, a boost converter 377.1 is used to boost the DC level of voltage from battery 354b to that of battery 354a. Likewise, electrical voltage generated by the user via generator 340 is appropriately filtered by a boost converter 377.2. The outputs of boost converters 377.1 and 377.2 are controlled by electronic controller 370.

Figure 6:
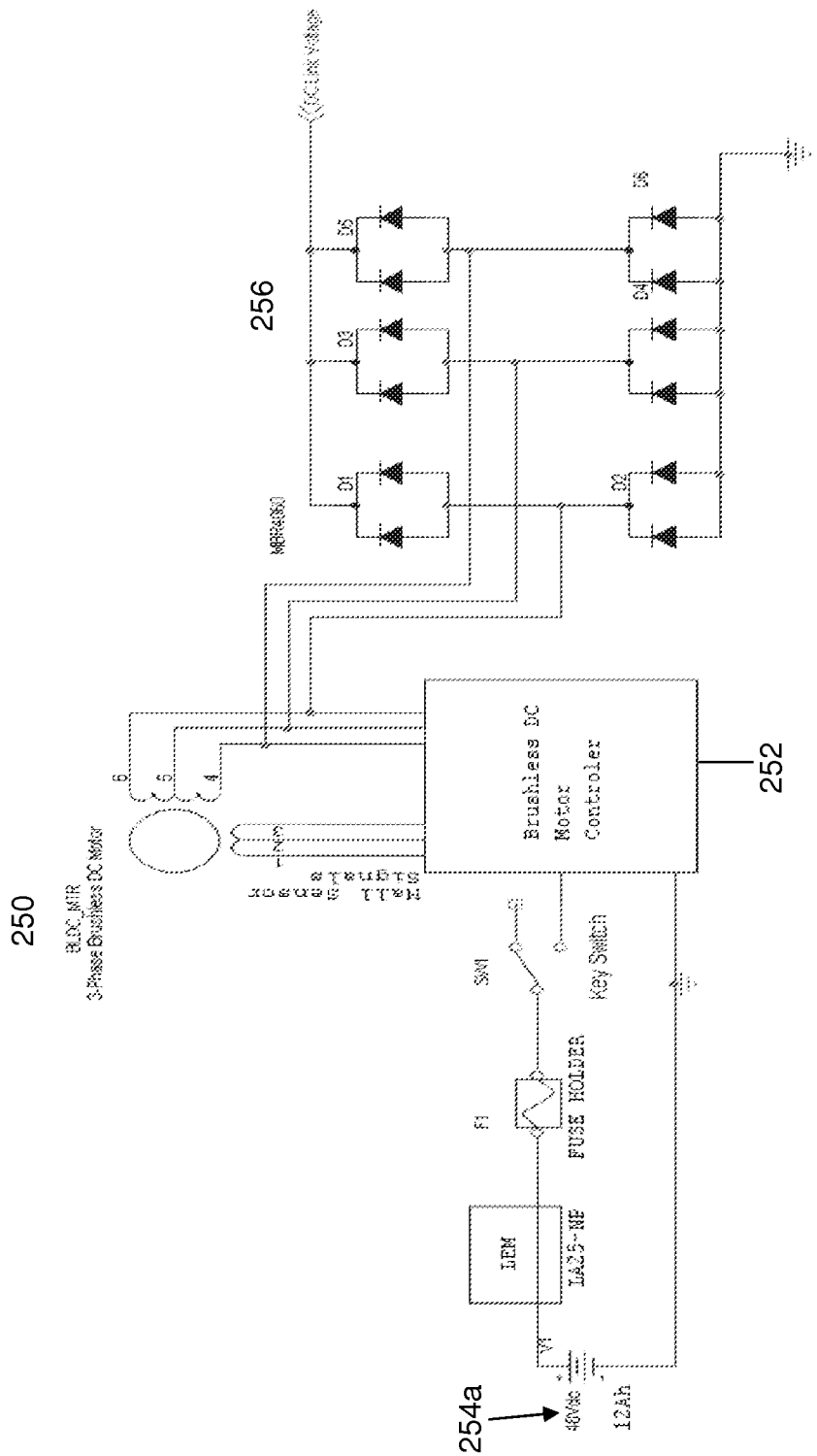
FIG. 6 is a schematic diagram of a portion of a vehicle electrical system according to one embodiment of the present invention.
Figure 7A:
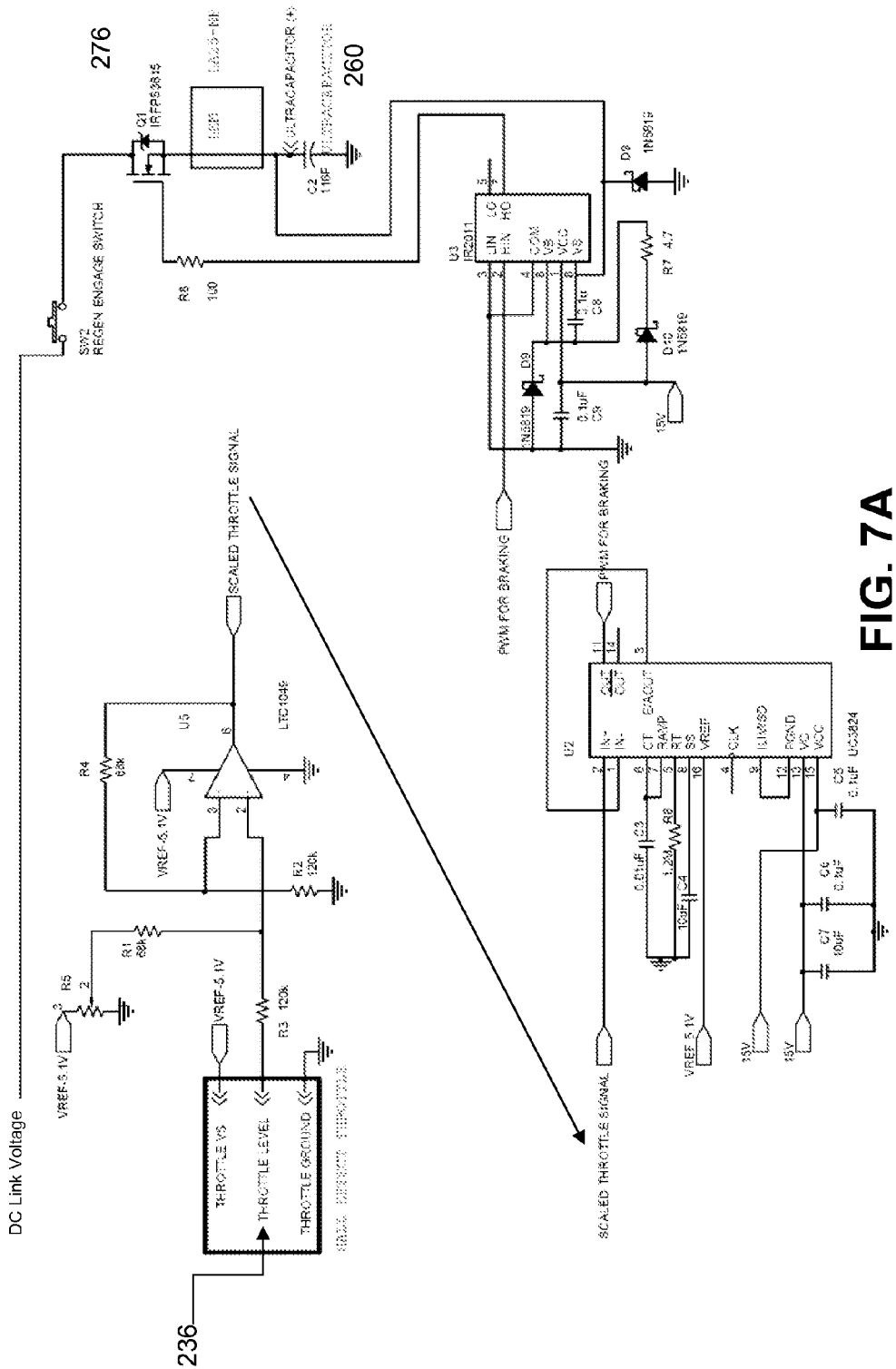
FIG. 7A shows three circuit schematic diagrams for a vehicle electrical system according to one embodiment of the present invention.
Figure 7B:
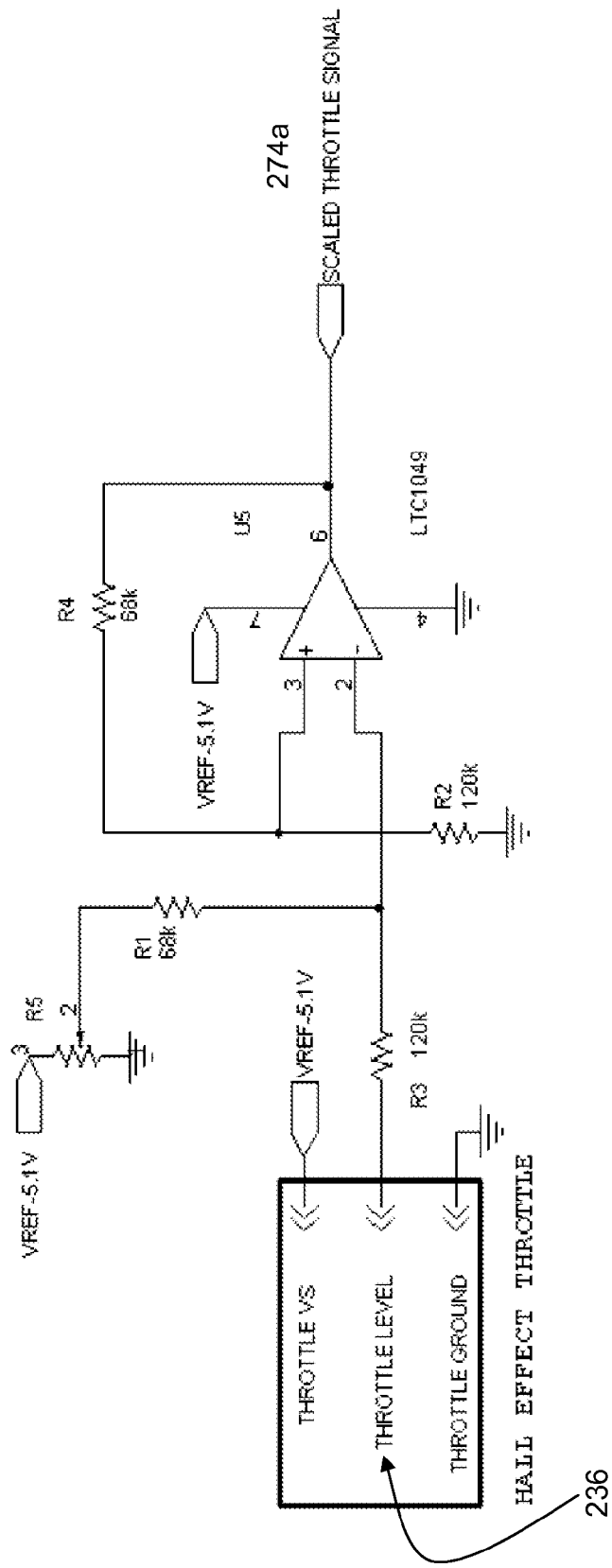
FIG. 7B is an enlargement of one of the schematics of FIG. 7A.
Figure 7C:
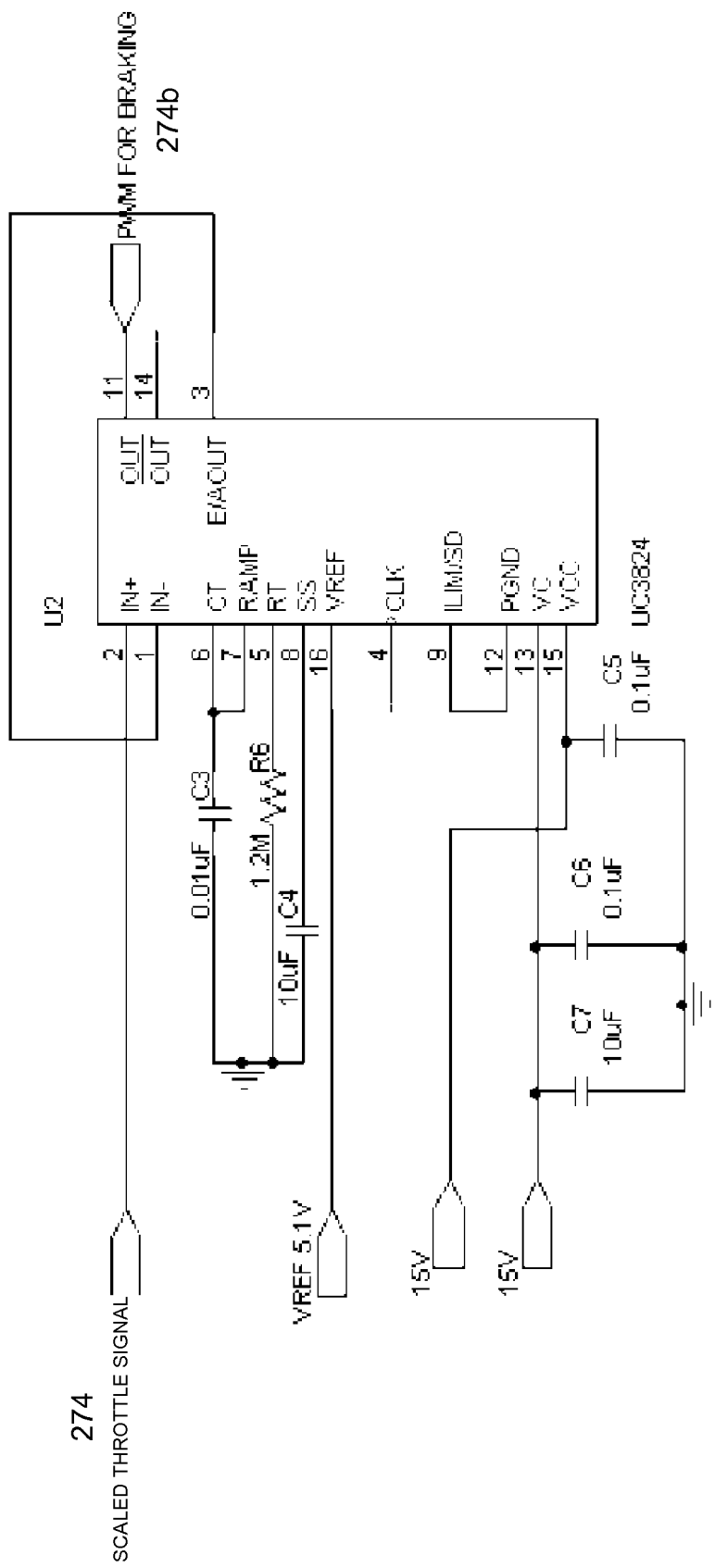
FIG. 7C is an enlargement of one of the schematics of FIG. 7A.
Figure 7D:
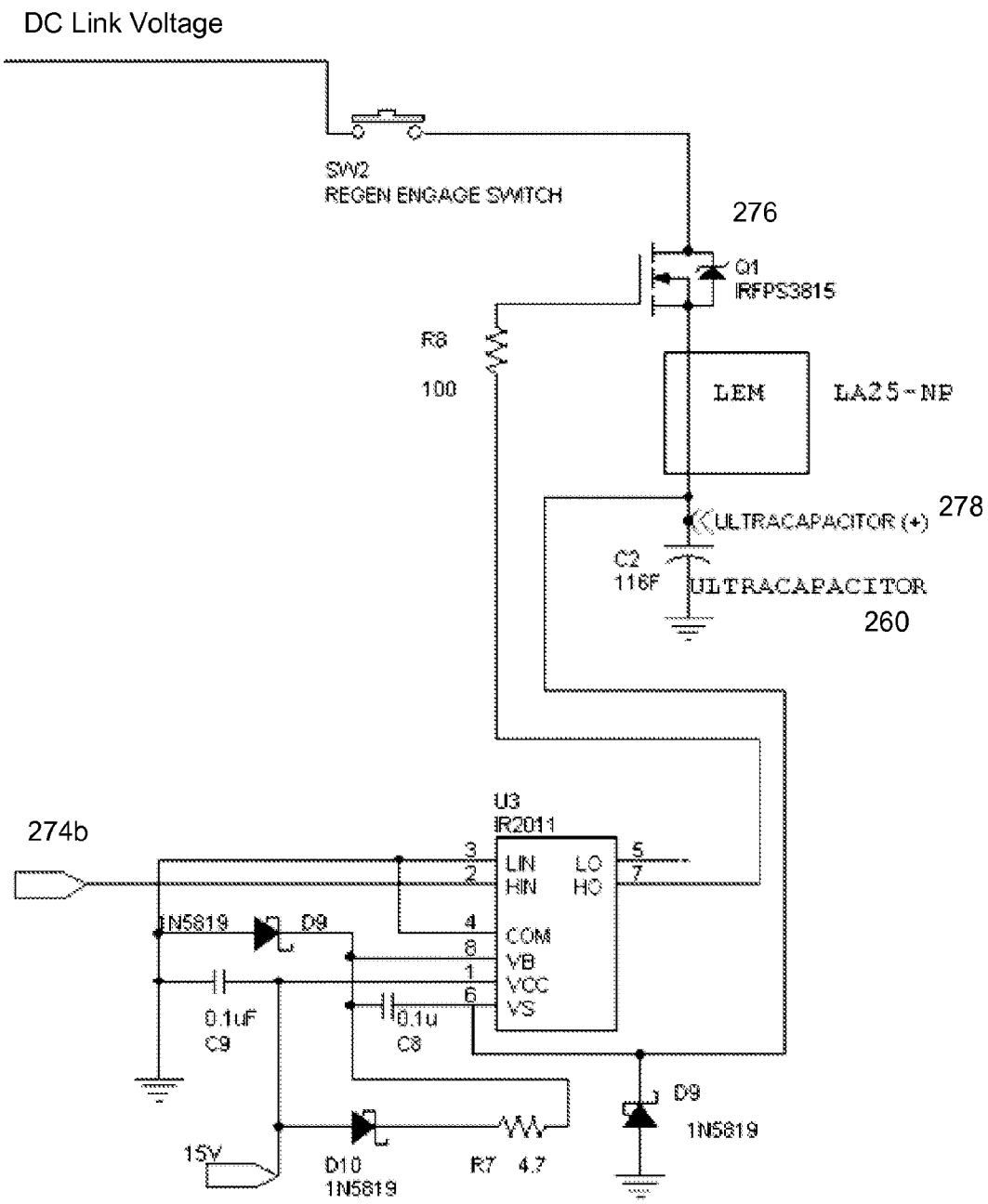
FIG. 7D is an enlargement of one of the schematics of FIG. 7A.

FIG. 6 shows a schematic diagram of a portion of vehicle 220, including motor 250, controller 252, and rectification circuitry 256. Circuit 256 establishes a DC link voltage that is provided to switch SW2 of FIG. 7A. FIG. 7A shows schematics for the throttle 236, the circuitry for creating a pulse width modulated signal from the throttle signal, and further a portion of the circuitry for chopping the rectified power, including MOSFET 276. Enlarged portions of the schematics of FIG. 7A are shown on FIGS. 7B, 7C, and 7D that follow.

Figure 8A:
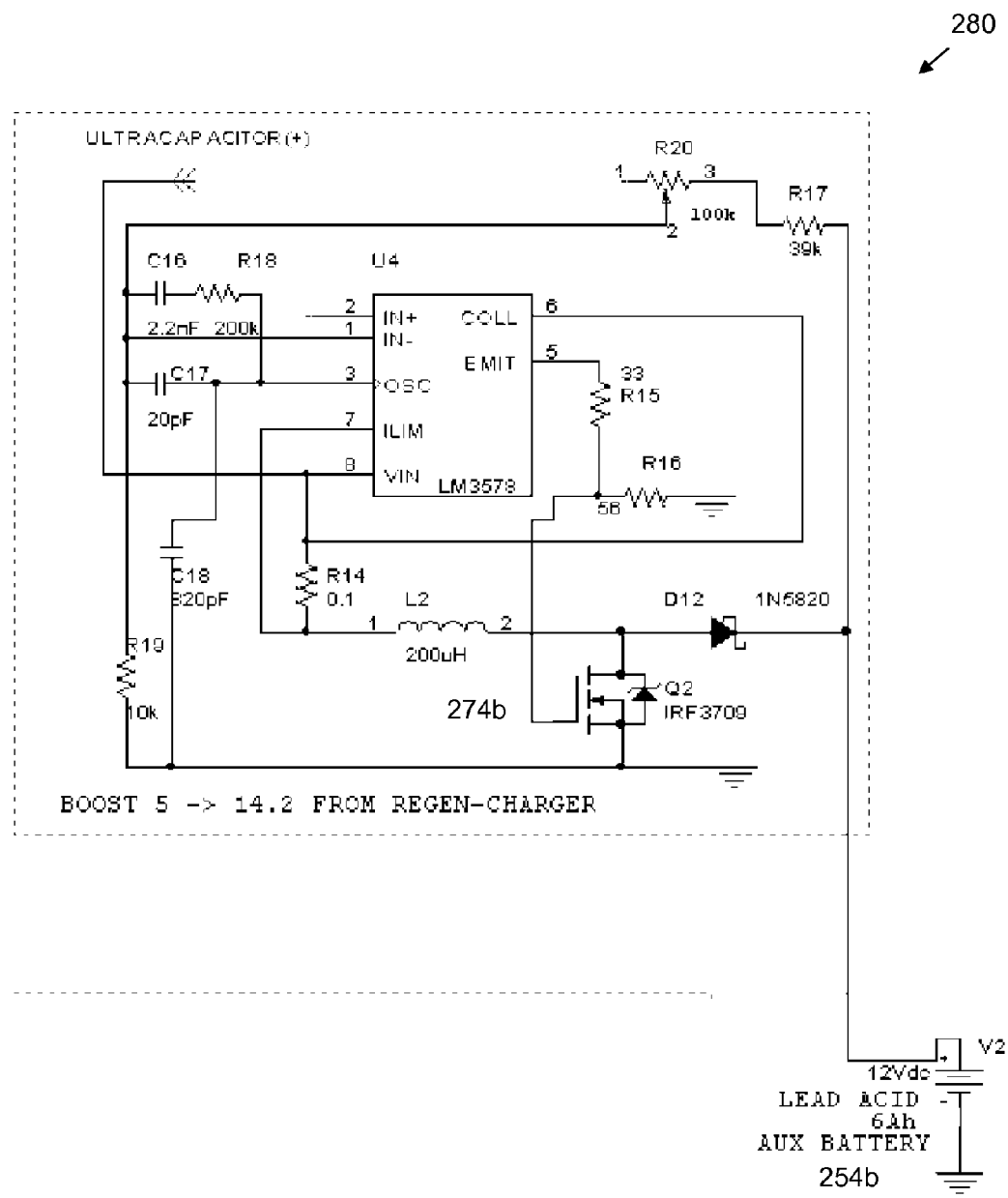
FIG. 8A is a schematic diagram of an energy retransfer circuit according to one embodiment of the present invention.
Figure 8B:
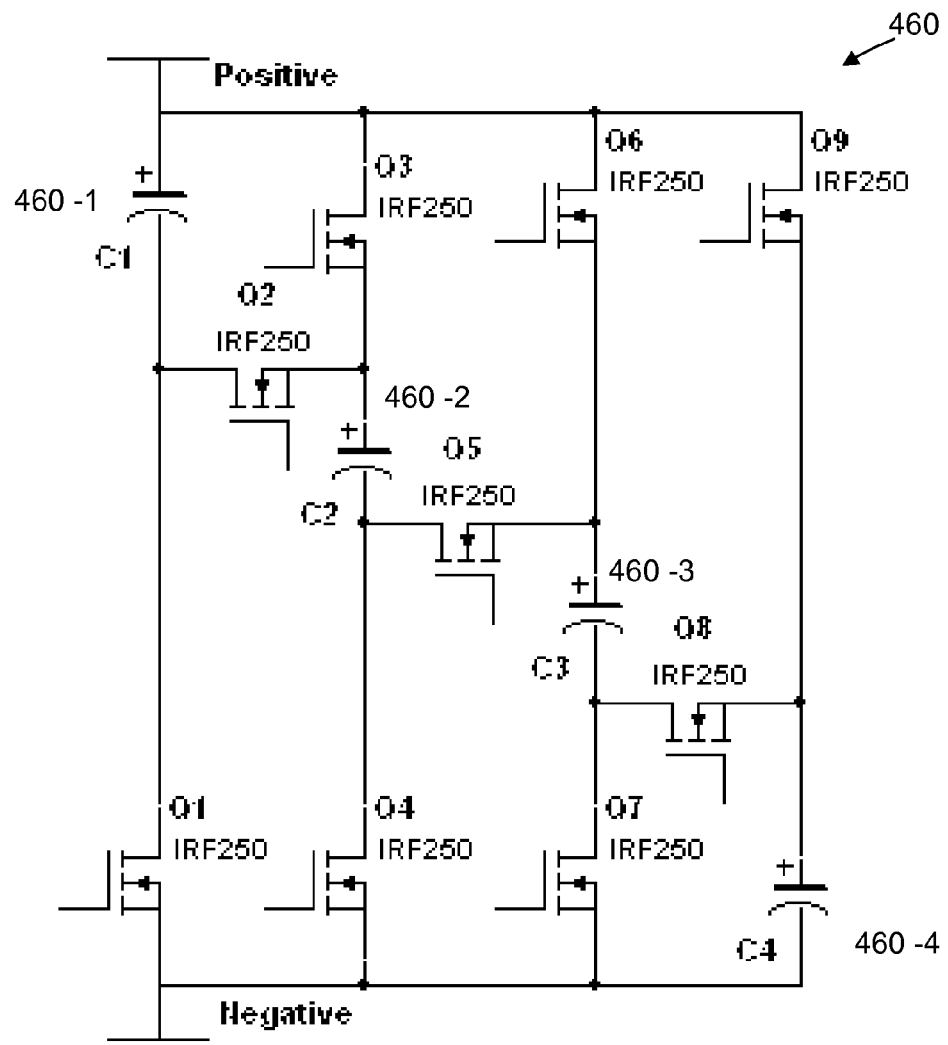
FIG. 8B is a schematic diagram of a circuit for charging and discharging of capacitors either in parallel or series.

FIG. 8A is an enlargement of an energy retransfer circuit 280 that is in electrical communication with the high side of capacitor bank 260, as well as auxiliary battery 254b. FIG. 8B is a schematic depiction of a capacitor bank 460 according to another embodiment of the present invention. In one embodiment, capacitor bank 460 includes a plurality of capacitors Cx that are configurable in either a series or parallel relationship. In each of the capacitors (in FIG. 8B there are four capacitors (C1, C2, C3, and C4, all of which are preferably ultracapacitors) are in electrical communication with a plurality of switches (Q1-Q9). Each of the switches Qx have a gate that is in electrical communication with controller 470. Controller 470 has a mode of operating in which the switches are established so as to place capacitors 460-1 through 460-4 in parallel, such as during charging of the capacitors. Further, controller 470 has another mode of operating in which the switches Qx are arranged to place capacitors 460-x in series, such as for discharging into battery 454a. The following table shows the states of switches Qx for either series or parallel operation.

Transistor operating positions table; 0=OFF 1=ON

|  | Q1 | Q2 | Q3 | Q4 | Q5 | Q6 | Q7 | Q8 | Q9 |
| --- | --- | --- | --- | --- | --- | --- | --- | --- | --- |
| Series For Discharging | 0 | 1 | 0 | 0 | 1 | 0 | 0 | 1 | 0 |
| Parallel For Charging | 1 | 0 | 1 | 1 | 0 | 1 | 1 | 0 | 1 |

Figure 9A:
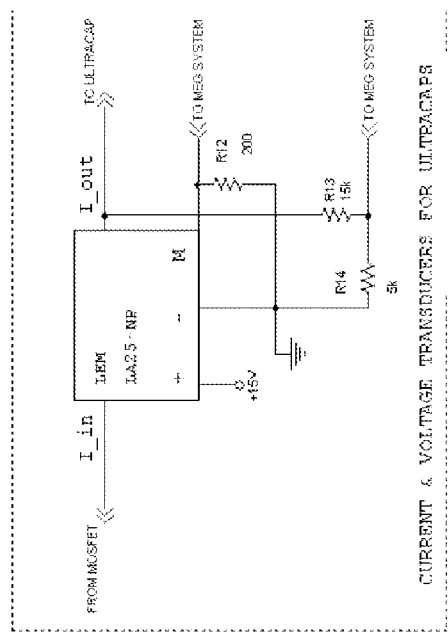
FIG. 9A shows a schematic circuit diagram used for powering instrumentation for a vehicle according to one embodiment of the present invention.
Figure 9B:
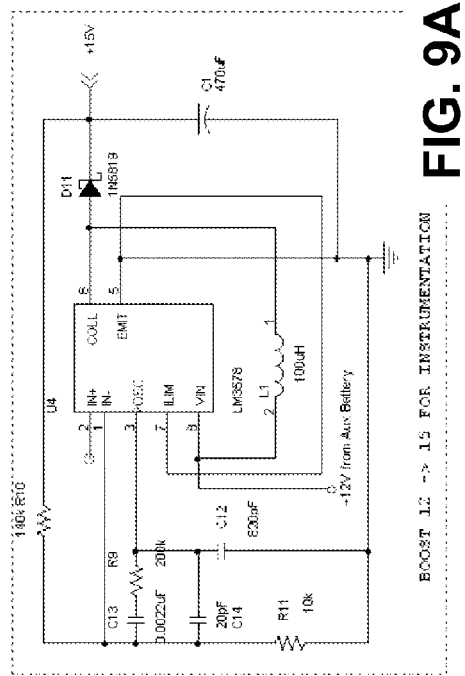
FIG. 9B shows a schematic circuit diagram used for powering transducers for the ultracapacitors according to one embodiment of the present invention.
Figure 9C:
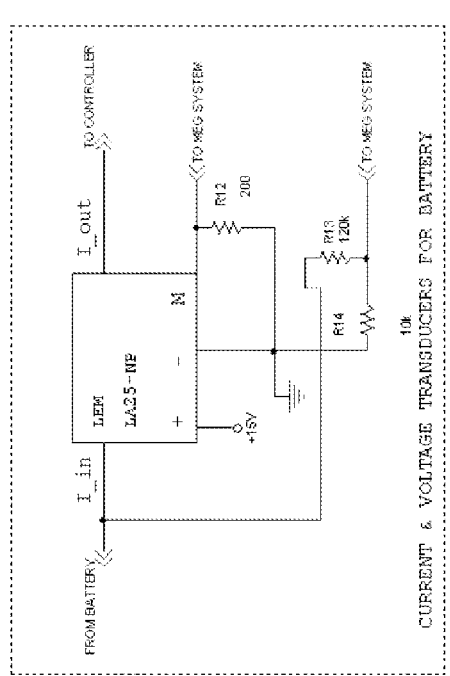
FIG. 9C shows a schematic circuit diagram used for powering transducers for the battery for a vehicle according to one embodiment of the present invention.

FIGS. 9A, 9B and 9C shows schematic diagrams for circuitry 290 related to instrumentation for vehicle 220.

As a system a NEV can be evaluated for basic criteria that can be applied to any EV such as maximum speed, acceleration, maximum distance per charge, time per recharge, braking, regenerative energy at different speeds, etc. Table-1 compares the performance of two different controllers with low torque applied while on the test rig. Controller A is designed for driving and controller B is capable of bi-directional energy flow. When Controller A is used, the regenerative energy from braking is captured in to an ultracapacitor. When Controller B is used, the regenerative energy is allowed to flow into the batteries.

TABLE 1-1

Acceleration comparison of two different
controllers with very small load (11 lb)

| Speed in mph | Controller A time in ms | Controller B time in ms | Frequency of Hall Sensor Pulses |
| --- | --- | --- | --- |
| 0 to 5 | — | — | 15.55 Hz |
| 0 to 10 | — | 17.00 | 22.91 |
| 0 to 15 | 80.15 ms | 100.00 | 38.87 |
| 0 to 20 | 182.15 ms | 165.05 | 51.82 |
| 0 to 25 | 350.00 ms | 240.15 | 64.78 |

Due to energy high cost research focusing on developing systems for electrical vehicles (EVs) and hybrid electric vehicles (HEVs) has entered a rapid development. A braking system of any vehicle is utterly important as the safety of passengers comes first. Vehicles having a motor coupled to the wheels have the option of implementing a regenerative mode of braking. This further improves overall system efficiency by recovering kinetic energy from the mass in motion. Overall energy efficiency can be further improved by placing the motor on the wheel itself. This eliminates the losses during transmission.

BLDC hub wheel based systems can be used in neighborhood electric vehicles as EVs according to some embodiments of the present invention are easy to assemble. System complexity, braking safety, and the amount of energy regenerated are aspects to be considered when developing a regenerative braking system for an EV. Furthermore, the type of traction motor used, driving style and regeneration capturing means define how a regenerative braking system could be implemented. The regenerated energy is transferred to an ultracapacitor to prevent damage to the battery bank due to high current rates used for braking.

A vehicle's braking must be controllable by the person driving the vehicle. Mechanical energy is converted into voltage by a motor acting as a generator. The output of the motor can be either AC or DC. One method to control AC machines is to use reference frame transformation. Some AC machine controllers are based on inverse reference frame transformation. Some embodiments of the present invention incorporate a brushless DC (BLDC) motor being used in (also known as a Trapezoidal Permanent Magnet Synchronous Machine). In some embodiments BLDC is controlled using reference frame transformation based controls for regenerative braking purposes. mechanical circuit. The magnetic coupling allows the energy transfer between the stationary circuits (also known as the stationary reference frames) to the rotating circuit (also known as the rotating reference frame).

A recumbent tricycle 20 according to one embodiment of the present invention weighed 44 kg without the rider and was capable of obtaining a maximum speed of 36 kph with a rider weighing 72 kg. The battery pack 72 included 48V, 12 Ah sealed lead acid batteries. The electric tricycle can run continuously for 3 hours at 15 mph on the test stand without a load. The amount of current drawn from the motor determines how much negative torque is generated on the wheel for braking. The 1900 W hub motor is rated for 40 A. When regeneration is done using an ultracapacitor the maximum current drawn was 30 A.

The type of DC/DC topology to be used depends on the application. The power handling capability of the generator (motor) is one of the considerations in a regenerative system. A bi-directional buck-boost converter along with ultracapacitors can reduce the peak battery (deep cycle valve regulated lead acid battery) current by 40%. The DC bus voltage regulation has improved by 30%.

When regeneration is performed the back EMF decays rapidly while the ultracapacitor voltage rises. In addition to that the low internal impedance of the ultracapacitor causes some DC-DC converters to lose stability. A vehicle and controller according to one embodiment of the present invention includes a simple regenerative braking system for a neighborhood vehicle that is effective in recovering energy and braking the vehicle properly. The system permits the use of a preferred frequency and pulse width to recuperate a desirable amount of energy. Simplicity of the topology and how the rider controls the rate of braking are two aspects of the proposed system.

The braking requirements of a vehicle are designed specifically for that vehicle. Maximum weight and maximum speed are two factors that influence the braking system design. These factors for a tricycle were measured prior to designing the braking system. The electrical braking system should perform similar to the mechanical braking system. A speed profile during braking with mechanical brakes engaged provided the required energy absorption rate and the duration of the deceleration required. The motor's maximum power handling capability, the current rating of machine's windings, and the other wire linkages interconnecting the systems were considered in designing the braking system because the higher the negative torque required, the higher the negative current into a machine.

When regenerating, the brushless DC motor generates a trapezoidal back EMF across its terminals. The rectifying bridge rectifies this AC voltage to a DC voltage to be controlled by the MOSFET that follows. A high current, high voltage MOSFET is placed between the ultracapacitor and the rectifier which turned on and off depending on the throttle level signal provided to the PWM generator. Due to the low resistance in the ultracapacitor, it draws a significantly higher current when the switch is turned on, when compared to a battery. The switch turnoff is timed to prevent damage to the system. This is controlled by selecting the switching frequency that limits the peak current fed to the ultracapacitor.

Regenerative braking related energy analysis has been explored for automobile-type of wheeled vehicles with front wheel braking and rear wheel braking. Using basic energy equation for a mass in motion ($\frac{1}{2}$) $mv^2$, the tricycle has 5800 J at top speed, right before braking. When a coast stop occurs on the test stand with a light load, the regenerative braking system is unable to brake at speeds that generate DC link voltages below the capacitor voltage. A control system according to one embodiment of the present invention tries to maintain the capacitor voltage at a low level (preferably within 4V to 8V range).

According to FIG. 4A the chopper circuit switches the regenerated voltage to the ultracapacitor. Due to low resistance in the ultracapacitor, the current charging the capacitor rises rapidly. As illustrated in FIG. 5, the PWM frequency is set in such a way that the peak current can be limited by controlling the duty ratio of the converter. The riders throttle input controls the pulse width of the switching signal. It can be varied from 0% to 100% to apply the desired amount of negative braking torque. This throttle controlled current limiting repeats each cycle until the back e.m.f. generated is lower than the capacitor voltage. FIGS. 9A-9C depict electrical and electronics schematics diagrams.

In order to brake even at lower speeds, the capacitor voltage is maintained relatively low. Two methods are used in some embodiments to transfer the ultracapacitor energy to the battery (either the main motive or the auxiliary battery). The energy can be transferred to the battery during operation when the brake is not applied or the transfer converter can continuously keep on charging the battery if the battery is not fully charged (during braking and when brake is not engaged). A separate rectifier bridge is used to convert AC in to DC but synchronous rectification can also be used rather than having an additional three phase rectifying bridge to rectify the back e.m.f.

The power supply stage of a vehicle according to one embodiment that a present invention boosts 12V from the auxiliary battery to 15V using a boost circuit to power the regenerative braking circuitry. An input signal conditioner obtains the user throttle request and converts it to the PWM controller reference in order to control the pulse width of the MOSFET. The PWM generator passes the pulses to a driver which controls the actual turning on and off of the MOSFET.

The auxiliary battery provides power to the regenerative braking controls, the touch screen display, the data acquisition system, and to the instrumentation circuitry. The DC-DC boost converter connected to the ultracapacitor transfers the energy into the auxiliary battery. In one embodiment, the power transfer circuit is self-powered and initiates energy transfer once the ultracapacitor voltage reaches above 5.2 Volts. It is a boost converter based on an LM3578AN regulator. The current limit in the circuit prevents high currents during battery charging.

Figure 10:
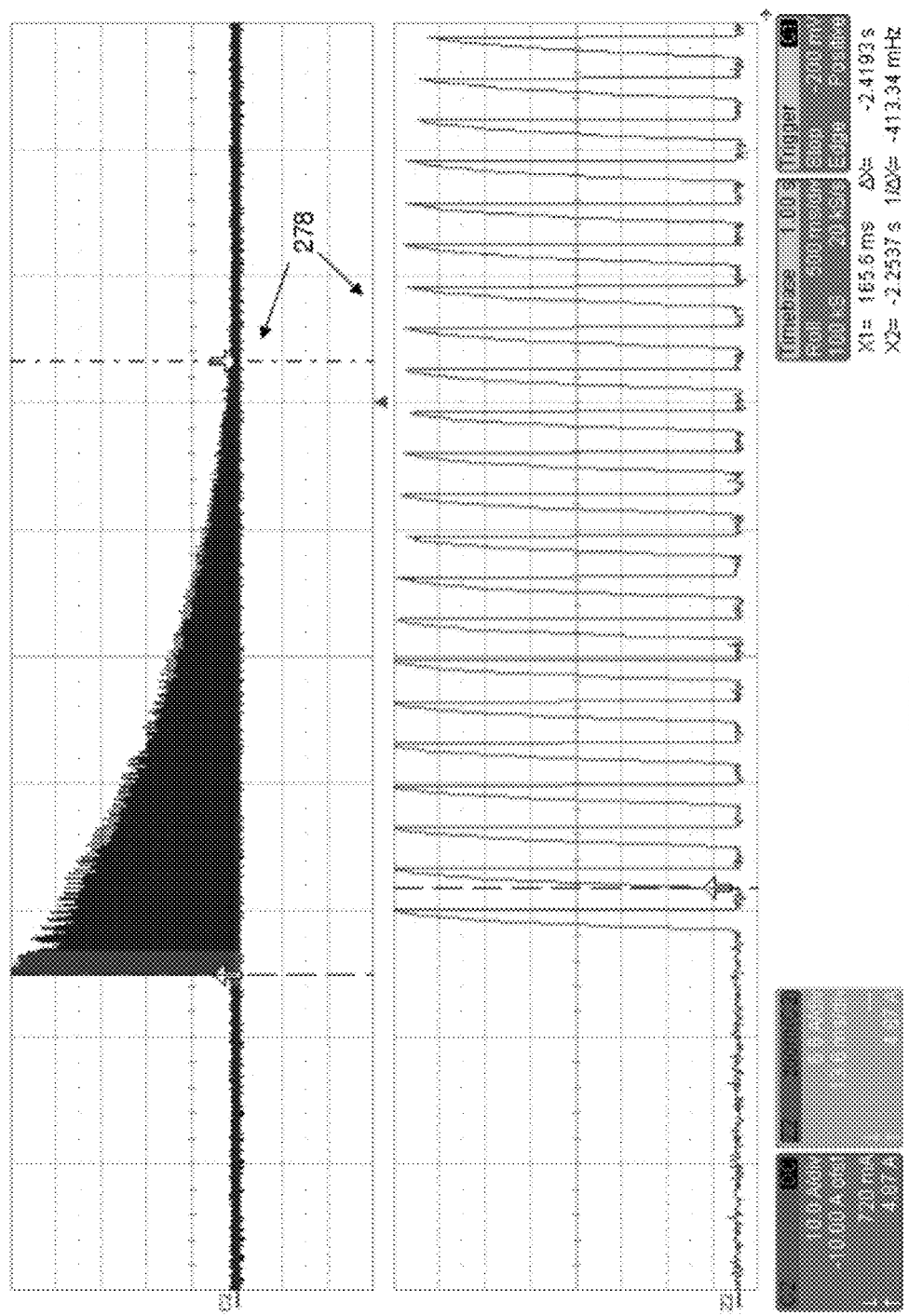
FIG. 10 shows a regenerated current flowing to the ultracapacitor with a vehicle according to one embodiment of the present invention.

Switching frequency in some embodiments is established based on the time constant of the energy capturing system (the ultracapacitor bank). Current drained from the electric machine (BLDC Motor) establishes a negative torque on it, causing deceleration. When the MOSFET is turned on during regenerative braking, the DC bus voltage is directly applied to the ultracapacitor. Due to the low impedance in the ultracapacitor, the current starts to rise rapidly. As shown in FIG. 5, turning the MOSFET off at different time intervals result in different current levels. Higher on time provides a higher current draw. This provides the basis for a user-controlled regenerative braking system. The current rise time is considered in selecting the switching frequency. Higher frequency will prevent the capacitor reaching higher currents, and hence, higher negative torque. Lower frequency would reach the maximum current instantly. However, the range of frequencies represented by FIG. 5 are too fast to permit the user enough time to adjust the throttle level to change the braking level. FIG. 10 shows how an actual switching current waveform when regenerative braking is performed and the pulse width is not 100%. The current switching frequency used was 390 Hz.

Figure 13:
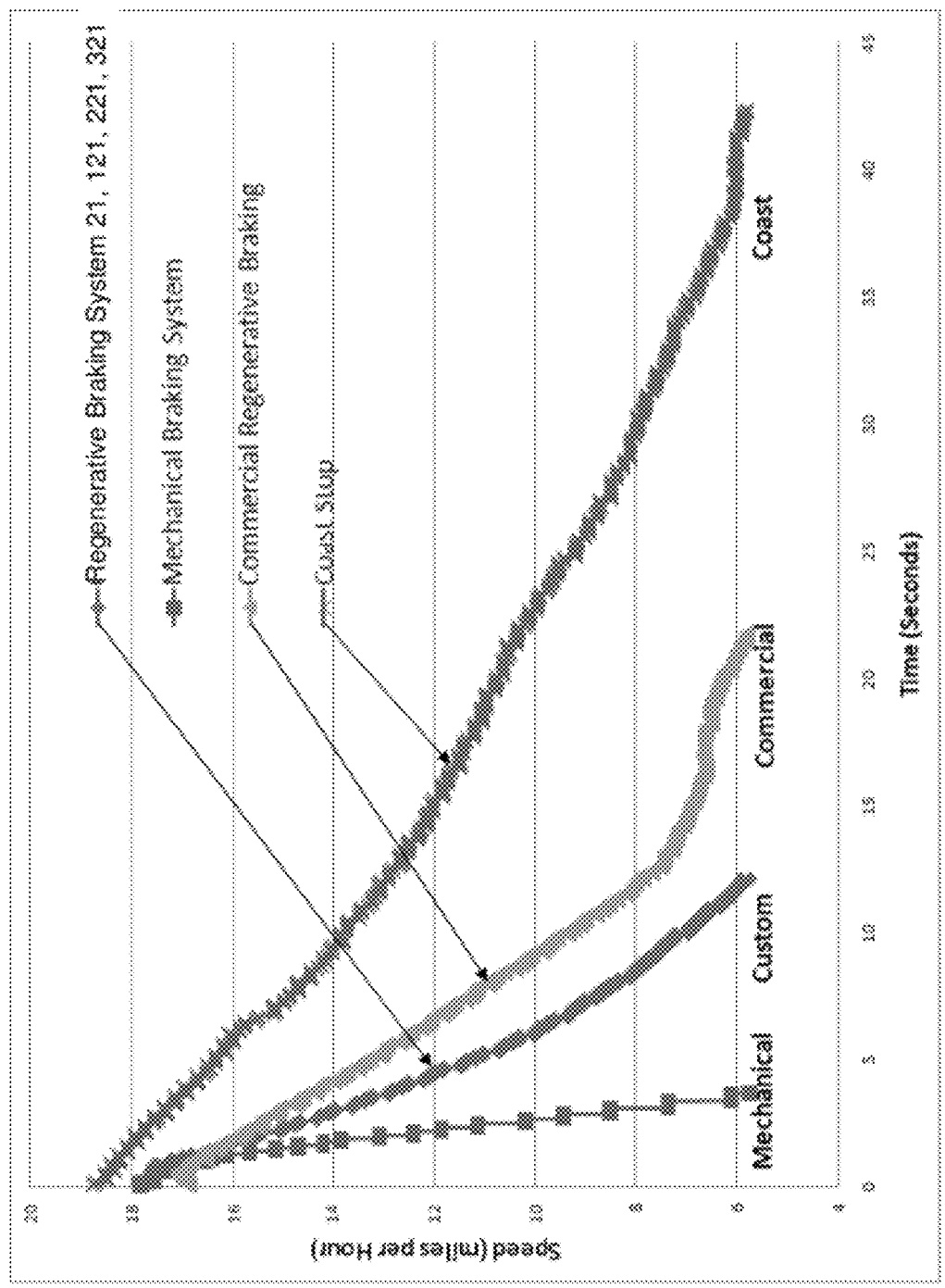
FIG. 13 shows three deceleration speed profiles.

A regenerative braking system according to one embodiment of the present invention is compared with a commercially available regenerative braking system and a mechanical braking system. The performance evaluation criterion is based on the energy recovered by each method and the time taken to stop the vehicle. FIG. 13 highlights the data collected. It shows the speed profile of the tricycle with each braking technique.

Table 5.6 compares the energy recovered under each braking system. The comparison shows that the custom regenerative braking system recovers two to three times more energy than the commercial regenerative braking system.

TABLE 5.6

Comparison of Energy Recovered During Braking

| Data Set # | Mechanical Braking | | Commercial Regenerative Braking | | Custom Regenerative Braking | |
|---|---|---|---|---|---|---|
| | Energy/ (J) | As a Percentage of total Energy | Energy/ (J) | As a Percentage of total Energy | Energy/ (J) | As a Percentage of total Energy |
| 1 | −3208.07 | −100% | 303.09 | 6.45% | 139.20 | 2.96% |
| 2 | −2696.65 | −100% | 290.00 | 7.63% | 306.24 | 8.47% |
| 3 | −3079.51 | −100% | 325.92 | 6.67% | 436.53 | 15.40% |

TABLE 5.6-continued

Comparison of Energy Recovered During Braking

| Data Set # | Mechanical Braking | | Commercial Regenerative Braking | | Custom Regenerative Braking | |
|---|---|---|---|---|---|---|
| | Energy/ (J) | As a Percentage of total Energy | Energy/ (J) | As a Percentage of total Energy | Energy/ (J) | As a Percentage of total Energy |
| 4 | −3865.97 | −100% | 320.07 | 5.97% | 567.82 | 18.54% |
| 5 | −3783.67 | −100% | 327.39 | 6.69% | 434.05 | 16.44% |
| 6 | −4206.28 | −100% | 344.29 | 6.57% | 538.98 | 13.30% |
| 7 | −5230.74 | −100% | 321.53 | 6.57% | 625.50 | 17.36% |
| 8 | −5120.25 | −100% | 307.65 | 6.40% | 654.40 | 17.41% |
| 9 | −5028.31 | −100% | 312.65 | 6.56% | 511.88 | 17.32% |
| 10 | −5668.44 | −100% | 308.48 | 6.81% | 520.72 | 14.75% |
| 11 | −5812.12 | −100% | 360.95 | 6.34% | 537.87 | 14.28% |
| 12 | −5817.31 | −100% | 340.05 | 5.67% | 528.59 | 14.54% |
| 13 | −5601.05 | −100% | 388.50 | 7.05% | 618.42 | 19.98% |
| 14 | −5763.84 | −100% | 311.62 | 6.88% | 738.04 | 18.67% |
| 15 | −5181.86 | −100% | 355.17 | 6.53% | 815.43 | 22.17% |
| 16 | — | | 303.09 | 6.45% | 818.12 | 19.80% |

Road tests with a 150 lb driver revealed the following with a vehicle according to one embodiment of the present invention: maximum speed of 35 mph; acceleration 0-20 mph in 12 seconds; 45 minutes driving time with 12 AH batteries; 1 hour 45 minutes charging time; and 8% energy recovery as compared to less than 1% with commercial regenerative controller.

Figure 11:
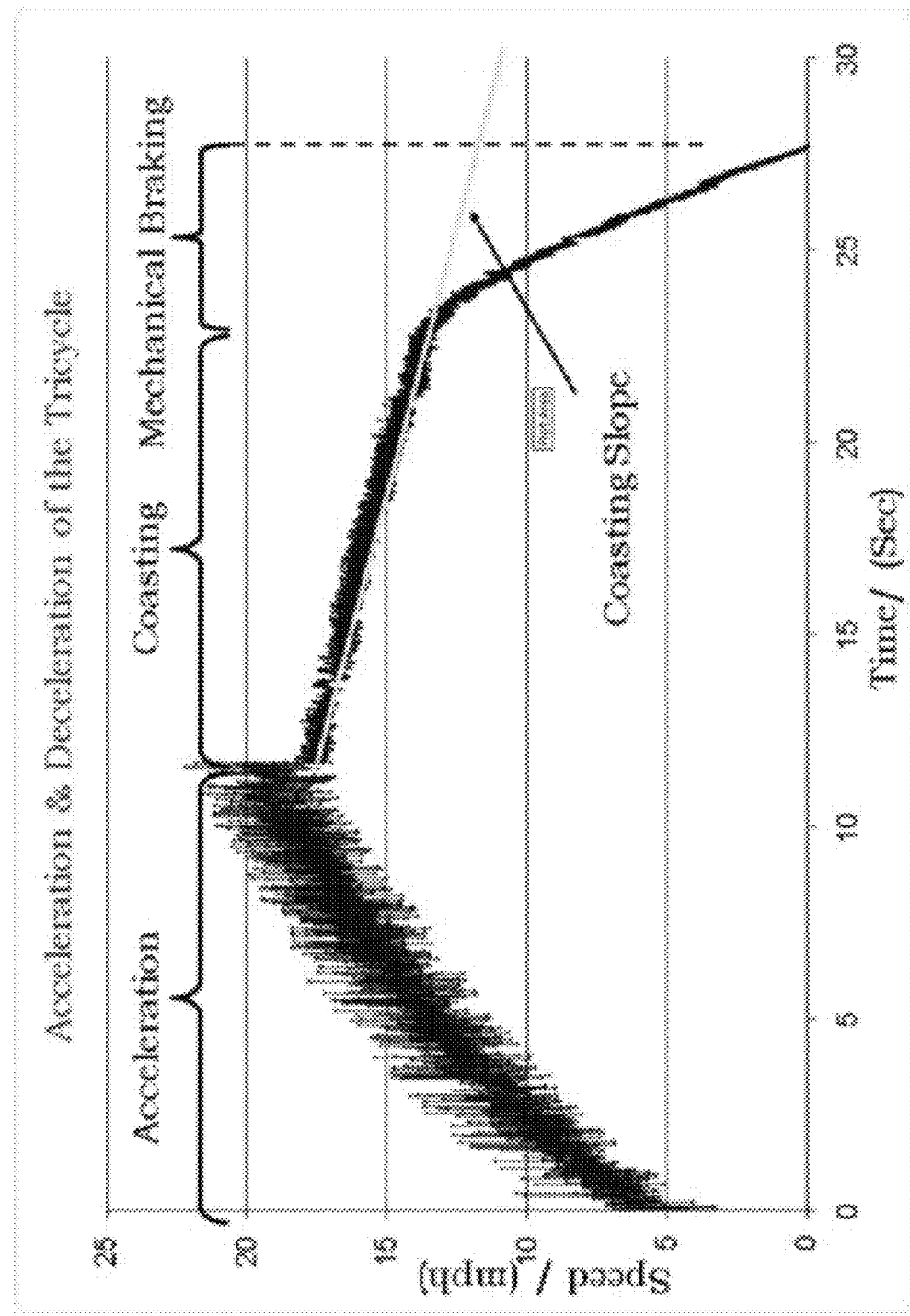
FIG. 11 shows acceleration and costing (without regeneration) with a vehicle according to one embodiment of the present invention.
Figure 12:
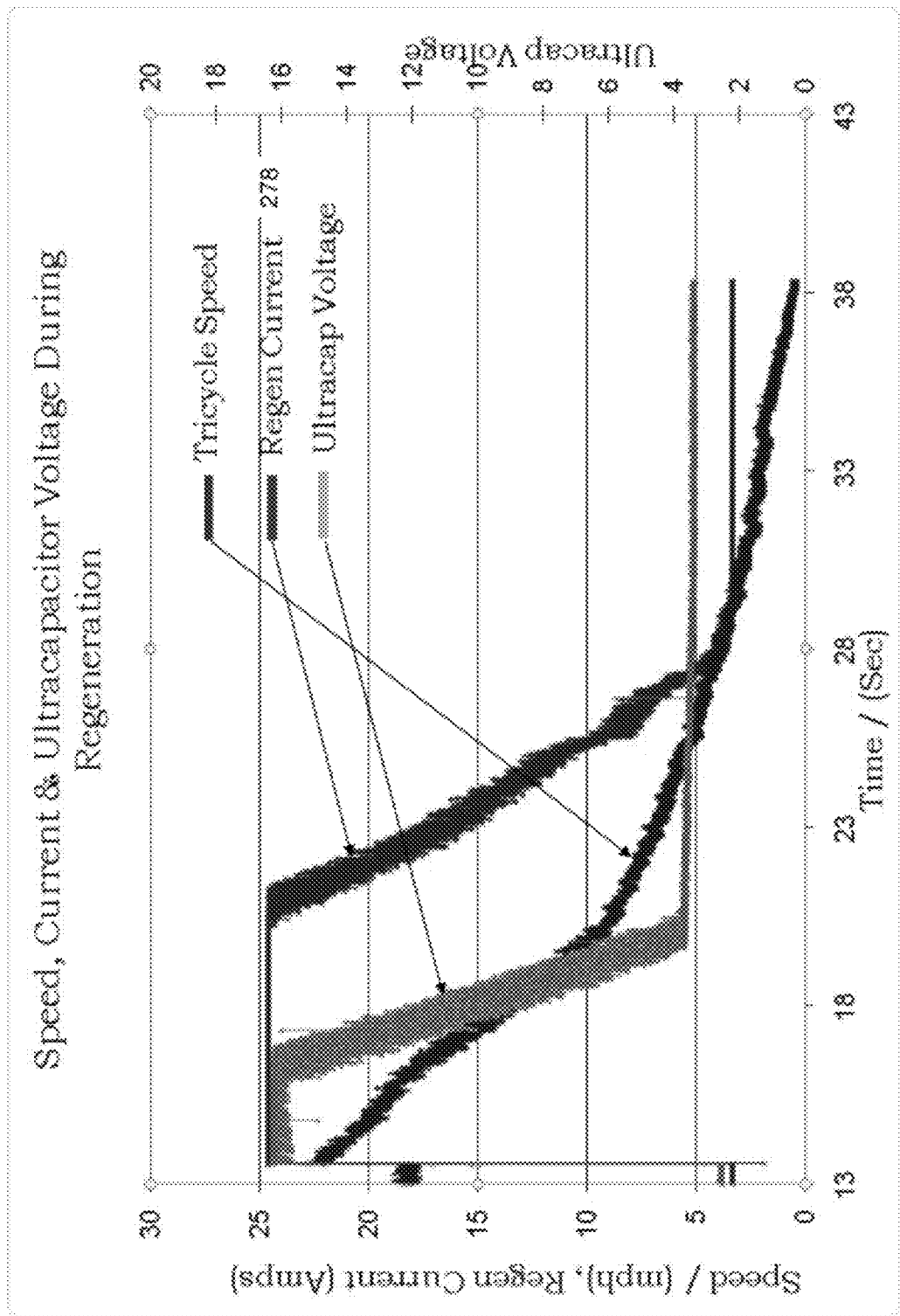
FIG. 12 shows deceleration with regeneration for a vehicle according to one embodiment of the present invention.

FIGS. 11 and 12 show the regenerative circuit performances with a vehicle according to one embodiment of the present invention: total kinetic energy at 20 mph was 5465 J; the regenerated relates to $(\frac{1}{2})*C*V^2$ or 549 J and the energy dissipated in the wheel relates to $I^2*R$ power, or 480 J.

Various embodiments of the present invention establish a relationship between regenerated power at different pulse widths for a fixed frequency. Some embodiments establish a relationship between regenerated power at different PWM frequencies with pulse width maintained constant. Yet other embodiments establish a relationship between the peak current drawn when the ultracapacitor gains voltage do determine the optimum voltage the ultracapacitor to be maintained. Still other embodiments establish a braking time for typical speeds at different pulse width values.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A vehicle, comprising:
   three wheels arranged as a tricycle and supporting a seat by a frame;
   a brushless DC motor mechanically coupled to at least one of the wheels;
   a rechargeable battery;
   an capacitor;
   an electronic controller in electrical communication with said capacitor, said battery, and said motor, said electronic controller being operable in at least two modes; and
   a pair of pedals operatively connected to an electrical generator, said pedals being adapted and configured for a human operator to provide motive power to said generator, said generator being in electrical communication with said controller;

wherein in a first mode of operation said controller receives electrical power generated by said motor and provides the power to said capacitor, and in a second mode of operation said controller provides power from said capacitor to said battery.

2. The vehicle of claim 1 wherein said capacitor is an electric double-layer capacitor.

3. The vehicle of claim 1 which further comprises a braking sensor providing an electrical signal corresponding to an amount of braking desired by the human operator, wherein the signal is provided to said controller, said controller chops the power received from said motor in a duty cycle, and the duty cycle of the chopped power corresponds to the electrical signal.

4. The vehicle of claim 3 wherein the signal is a pulse-width modulated alternating signal.

5. The vehicle of claim 3 wherein said controller receives alternating electrical power from said motor, and the frequency of the alternating power is less than about 1000 hertz.

6. The vehicle of claim 1 wherein said capacitor has a capacity of more than about 40 farads.

7. The vehicle of claim 1 which further comprises a plurality of capacitors electrically connected in parallel.

8. The vehicle of claim 1 which further comprises a braking member movable over a range of positions by the human operator, wherein said controller provides power to said capacitor in relation to movement of said member within a first portion of the range.

9. The vehicle of claim 8 wherein said braking member is a hand control.

10. The vehicle of claim 8 which further comprises a friction braking assembly mechanically connected to at least one said wheel, said braking assembly being actuatable by said braking member.

11. The vehicle of claim 10 wherein said braking assembly is not actuated by movement of said member within the first portion of the range.

12. The vehicle of claim 1 wherein said controller has a third mode of operation in which said controller provides power from said battery to said motor.

13. A method for operating an electric vehicle, comprising:
providing a tricycle, a generator rotatable by a foot pedal, a braking lever movable over a range of positions, at least one ultracapacitor, and a seat, at least one of the wheels being coupled to an electric motor capable of driving the wheel and capable of generating electricity;
generating alternating current electricity by the motor in response to placement of the lever within the range;
slowing the vehicle by said generating by the motor;
generating electricity from the generator by rotation with the foot pedal; and
charging the ultracapacitor with electricity from said generating by the motor and from said generating from the generator.

14. The method of claim 13 which further comprises a plurality of ultracapacitors configured for parallel operation during said charging the ultracapacitors.

15. The method of claim 13 which further comprises electronically reconfiguring the ultracapacitors to series operation, and powering the motor with the reconfigured ultracapacitors.

16. The method of claim 13 wherein said providing includes a rechargeable battery, and which further comprises charging the battery with the charged ultracapacitor.

17. The method of claim 13 wherein the motor is an electrically commutated motor.

18. The method of claim 13 wherein the ultracapacitor is associated with an RC time constant and which further comprises rectifying the alternating current electricity, chopping the rectified electricity at a predetermined frequency, and establishing the predetermined frequency to be less than about four time constants.

19. The method of claim 13 which further comprises establishing a duty cycle corresponding to placement of the level within the range, wherein said charging corresponds to the duty cycle.

20. The vehicle of claim 1 wherein said pedals are foot pedals.

21. The vehicle of claim 1 wherein two of said wheels are rotate about a common axis in front of said seat.

22. The vehicle of claim 21 wherein said pedals are foot pedals located in front of the common axis.

* * * * *

UNITED STATES PATENT AND TRADEMARK OFFICE
CERTIFICATE OF CORRECTION

PATENT NO.         : 8,567,547 B2
APPLICATION NO.    : 13/069791
DATED              : October 29, 2013
INVENTOR(S)        : N. Athula Kulatunga Page 1 of 1

It is certified that error appears in the above-identified patent and that said Letters Patent is hereby corrected as shown below:

In the Claims

In col. 13, claim 3, line 13, please delete "the" and insert in lieu thereof --a--.

In col. 13, claim 8, line 28, please delete "the" and insert in lieu thereof --a--.

In col. 14, claim 21, line 39, please delete the word "are".

Signed and Sealed this
Twenty-eighth Day of January, 2014

Michelle K. Lee
*Deputy Director of the United States Patent and Trademark Office*